(12) United States Patent
Savoie et al.

(10) Patent No.: US 7,743,595 B2
(45) Date of Patent: Jun. 29, 2010

(54) DEVICE AND METHOD FOR HARVESTING WOODY CROPS

(75) Inventors: Philippe Savoie, Quebec (CA); Frederic Lavoie, Levis (CA); Luc D'Amours, St-Valerien de Rimouski (CA)

(73) Assignee: Her Majesty the Queen in Right of Canada as represented by the Minister of Agriculture and Agri-Food Canada, Hochelaga (QC) (CA)

( * ) Notice: Subject to any disclaimer, the term of this patent is extended or adjusted under 35 U.S.C. 154(b) by 0 days.

(21) Appl. No.: 11/825,460

(22) Filed: Jul. 6, 2007

(65) Prior Publication Data

US 2009/0007537 A1 Jan. 8, 2009

(51) Int. Cl.
*A01D 39/00* (2006.01)
*A01D 43/02* (2006.01)
*A01D 75/00* (2006.01)

(52) U.S. Cl. ..................................... 56/341
(58) Field of Classification Search ............ 56/341, 56/377, 16.4 R, 98, 119; 100/88
See application file for complete search history.

(56) References Cited

U.S. PATENT DOCUMENTS

| | | | |
|---|---|---|---|
| 2,055,677 A | | 9/1936 | Tallman et al. |
| 3,139,718 A | * | 7/1964 | Rickerd et al. .............. 56/119 |
| 3,388,538 A | * | 6/1968 | Markham ..................... 56/98 |
| 3,695,015 A | * | 10/1972 | Twidale et al. .............. 56/181 |
| 3,796,029 A | * | 3/1974 | Weigand et al. ............. 56/119 |
| 3,919,830 A | * | 11/1975 | Gerber ........................ 56/13.6 |
| 4,214,422 A | * | 7/1980 | McMillen .................... 56/119 |
| 4,249,366 A | * | 2/1981 | Dolberg et al. ............... 56/98 |
| 4,296,593 A | * | 10/1981 | Webb et al. .................. 56/98 |
| 4,592,398 A | | 6/1986 | Golob et al. |
| 5,052,170 A | | 10/1991 | Trenkamp et al. |
| 5,377,479 A | | 1/1995 | Wilstrand et al. |
| 5,661,961 A | * | 9/1997 | Westhoff et al. ......... 56/16.4 R |
| 5,799,466 A | * | 9/1998 | Underhill ..................... 53/399 |
| 6,062,011 A | | 5/2000 | Uhlending et al. |
| 6,679,042 B1 | | 1/2004 | Schrag et al. |
| 6,820,542 B1 | * | 11/2004 | Truitt ............................ 100/3 |
| 6,901,730 B1 | * | 6/2005 | Buresch et al. ............... 56/314 |
| 7,003,933 B2 | * | 2/2006 | Fukumori et al. ............ 53/504 |
| 2002/0059790 A1 | * | 5/2002 | Paulsen ........................ 56/377 |
| 2003/0093979 A1 | * | 5/2003 | Fukumori et al. ............ 53/587 |
| 2005/0160713 A1 | | 7/2005 | Viaud |

FOREIGN PATENT DOCUMENTS

DE 20112345 U1 * 10/2001
GB 2 357 417 A 6/2001

* cited by examiner

*Primary Examiner*—Árpád Fábián-Kovács
(74) *Attorney, Agent, or Firm*—Panitch Schwarze Belisario & Nadel LLP

(57) ABSTRACT

A device for harvesting crops comprising woody material including a processor arranged to mechanically work the woody material and to feed the mechanically worked woody material to a bale-forming mechanism, the bale-forming mechanism being arranged to form a bale of the mechanically worked woody material. The present invention also extends to a method for harvesting crops comprising woody material in a continuous operation including the steps of: (a) mechanically working the woody material using a processor of a harvesting device; (b) feeding the mechanically worked woody material to a bale-forming mechanism of the harvesting device; and (c) forming a bale from the mechanically worked woody material.

18 Claims, 19 Drawing Sheets

DEVICE AND METHOD FOR HARVESTING WOODY CROPS

FIELD OF THE INVENTION

The present invention relates to a device and a method for harvesting crops comprising woody material or the like.

BACKGROUND OF THE INVENTION

Woody crops are a potential source of fiber and biomass for energy. They can also be planted to reclaim contaminated soils, to protect sloping land against erosion, to act as a windbreak, or to create a buffer near sensitive waterways. Fast growing woody crops are an attractive proposition because of their widespread adaptation to various soils and climates and their short rotation. Some woody crops such as willow, poplar, aspen, alder, caragana and other species may be planted specifically for their short-rotation and their abundant biomass production. Several native species of woody plants (brushes) also grow naturally on abandoned land or near waterways.

There is a need to harvest regularly these woody crops for profitable uses of this fibre and biomass, and also to rejuvenate the vegetation. Typically, fast-growing woody crops are composed of a large number of stems ranging from 20 to 80 mm in diameter and 3 to 5 m in length after three years of growth. A three-year rotation is often considered the optimum cycle time to harvest for maximum yield over an extended life-cycle of 20 years and more for several perennial woody crops that spontaneously regrow after cutting. Conventional agricultural harvesters used for non-woody crops are not suitable for harvesting woody crops because they are not adapted for cutting through the relatively wide and hard stems of the woody crops. Also, the rigidity of the woody crop stems makes their baling more of a challenge.

For large area plantations of these woody crops, specialized cutter heads have been designed to cut the base of the woody crop stems and to feed the long stems into a precision-chop self-propelled (SP) forage harvester (U.S. Pat. No. 6,062,011). The SP cutter-chipper harvests woody crops in the form of chips which may be handled with augers and conveyors and stored in piles or silos.

One problem with the SP cutter-chipper is the relatively high cost of the machine, especially for small land owners. A second problem is the high moisture of the chips which form a dense pile with limited natural aeration and limited drying during storage. A third problem is the unsuitability of the SP cutter-chipper to harvest narrow strips of woody plants or to access uneven terrain with rocks or bumps where abundant brush may grow. Therefore, such a system works well for relatively large and flat areas, and where the 40 to 50% moisture content of the wood chips is acceptable, or where the wet chips can be dried artificially.

A number of attempts have been made to harvest woody crops in the form of bales which dry naturally to a greater extent than chips and which are easier to handle with a front-end loader readily available on many farms, thereby not requiring specialized augers or conveyors to handle the chips. U.S. Pat. No. 4,592,398 describes a system which cuts the stems, accumulates them on the side of the harvester and drops a bunch of stems on the side without tying or bundling. U.S. Pat. No. 5,377,479 describes a system which cuts the stems, conveys them in a bundle, slicing regularly, and tying the stems in relatively small bales. U.K. Pat. No. 2,357,417 describes a third system which proposes using a SP cutter-baler that ties large bales.

However, these prior systems are expensive, inefficient and not well suited for harvesting small areas. Therefore, it is desired to improve on these prior systems and to provide an efficient, low-cost baler-type harvesting device for woody crops to produce bales that can be handled easily, stored, and left to dry naturally during storage.

SUMMARY OF THE INVENTION

The present invention reduces the difficulties and disadvantages of the aforesaid designs by providing a device and a method which, in a broad sense, forms bales from crops having woody material. Advantageously, the forming of the bales is assisted by mechanically working the woody material before forming the bales. The mechanical working of the woody material and the bale-forming can be a continuous operation which means that bales of woody material can be formed uninterrupted.

By virtue of the invention, a single device is provided which mechanically works woody material and forms bales of the mechanically worked woody material. These functions can be performed by a single device and in a continuous operation. The mechanical working makes the woody material more pliable to assist in the bale forming. This device provides a cost-effective and efficient way of harvesting woody crops which has not been done previously. The bales which are formed by the device of the present invention can be easily handled and stored. Advantageously, woody material formed into bales provide a convenient way of drying the woody material, either indoors or outdoors with or without heating. It will be appreciated that the below described embodiments according to the present invention obviate the limitations and drawbacks of the prior art devices thus enabling safe and convenient use.

In one embodiment of the present invention, a device is provided for harvesting crops comprising woody material, said device including: a processor arranged to mechanically work the woody material and to feed the mechanically worked woody material to a bale-forming mechanism, said bale-forming mechanism being arranged to form a bale of the mechanically worked woody material.

Advantageously, the processor includes a crusher to compress or shred the woody material. Furthermore, the crusher includes a plurality of hammers, each hammer mounted to a rotor by a hinge, the rotor having a housing spaced therefrom and the hammers being arranged to compress the woody material against the rotor housing. Preferably, the spacing of the housing from the rotor is adjustable to vary the extent of compression of the woody material. Each hammer of the plurality of hammers has a gripping edge to grip the woody material, and the motion of the hammers and the rotor feeds the mechanically worked woody material to the bale-forming mechanism.

In one embodiment of the present invention, the processor further includes a cutter at a front end of the device, said cutter being arranged to cut standing woody material and to guide the cut woody material to the crusher. Preferably, the cutter includes at least one pair of circular saw blades, each saw blade of the at least one pair being arranged to rotate towards the other saw blade of the at least one pair and a portion of each of the saw blades overlapping one another to define a cutting point. Advantageously, the circular blades provide a neat cut and can prevent the stems of the woody crops from bursting.

In another embodiment, the device includes the crusher but not the cutter. In this embodiment, the crusher function as both a cutter and a crusher and is suitable for rough, uneven and rocky terrain and is also well adapted to pick up already cut woody material.

Advantageously, a rigid arm is provided having a first end and a second end, the first end being moveably connected to the device and the second end being moveably connectable to a vehicle for towing the device.

Preferably, the bale-forming mechanism includes a round bale chamber which is variable and includes a single belt.

Advantageously, the device includes an upper converger and a lower converger extending from a front face of the device for guiding the woody crops to the processor, wherein both the upper and lower convergers comprise a pair of diverging arms connected by a cross bar spaced from the front face of the housing. The cross bar of the upper converger is spaced further from the front face of the housing than the cross bar of the lower converger.

In another embodiment, device is provided for harvesting crops comprising woody material, said device including a rigid arm having a first end and a second end, the first end being moveably connected to the device and the second end being moveably connectable to a vehicle for towing the device; a processor arranged to mechanically work the woody material and to feed the mechanically worked woody material to a bale-forming mechanism, said bale-forming mechanism being arranged to form a bale of the mechanically worked woody material; the processor including a crusher to compress the woody material and a cutter to cut standing woody material and to guide the cut woody material to the crusher; and an upper converger and a lower converger extending from a front face of the device for guiding the woody crops to the cutter, said upper and lower convergers each comprising a pair of diverging arms connected by a cross bar spaced from the front face of the housing.

In yet another embodiment, a device is provided for harvesting crops comprising woody material, said device including a rigid arm having a first end and a second end, the first end being moveably connected to the device and the second end being moveably connectable to a vehicle for towing the device; a processor arranged to cut the woody material, to compress the woody material and to feed the compressed woody material to a bale-forming mechanism, said bale-forming mechanism being arranged to form a bale of the compressed woody material; and an upper converger and a lower converger extending from a front face of the device for guiding the woody crops to the processor, said upper and lower convergers each comprising a pair of diverging arms connected by a cross bar spaced from the front face of the housing.

The present invention also extends to a method for harvesting crops comprising woody material, said method comprising the steps of: (a) mechanically working the woody material using a processor of a harvesting device; (b) feeding the mechanically worked woody material to a bale-forming mechanism of the harvesting device; and (c) forming a bale from the mechanically worked woody material.

Advantageously, forward movement of the device guides the woody material to the processor. Preferably, the steps comprise a continuous operation.

Optionally, the method further comprises the step of cutting the standing stems of the woody crops using a cutter of the processor, before step (a). The cutting step may comprise rotation of two circular saw blades towards each other.

Advantageously, the woody crops are gathered together by a converger of the device before step (a) which inclines standing woody crops before the woody material is mechanically worked.

The mechanically working step comprises compressing the woody material to make it more pliable where the woody material is compressed by a plurality of hammers mounted on a rotor, the hammers compressing the woody material against a housing of the rotor as the rotor rotates. Advantageously in step (b), the motion of the hammers and the rotor feeds the mechanically worked woody material to the bale-forming mechanism.

For ease of understanding, a number of the terms used herein are defined below.

The term "woody" should be interpreted as containing wood or wood fibers, including plants with hard stems and other plants having stems resembling wood in terms of their physical and mechanical properties.

The term "crop" should be taken to mean plants or plant products that can be harvested. Crops include plants that grow naturally as well as cultivated crops.

By "harvesting" it is meant the act or process of gathering a crop which may or may not include the cutting of the crop. For example, "harvesting" should be taken to include the gathering of already cut crops.

BRIEF DESCRIPTION OF THE DRAWINGS

In order that this invention may be more readily understood, currently preferred embodiments will now be further described by way of example with reference to the accompanying drawings in which.

DETAILED DESCRIPTION OF THE INVENTION

Figure 1:
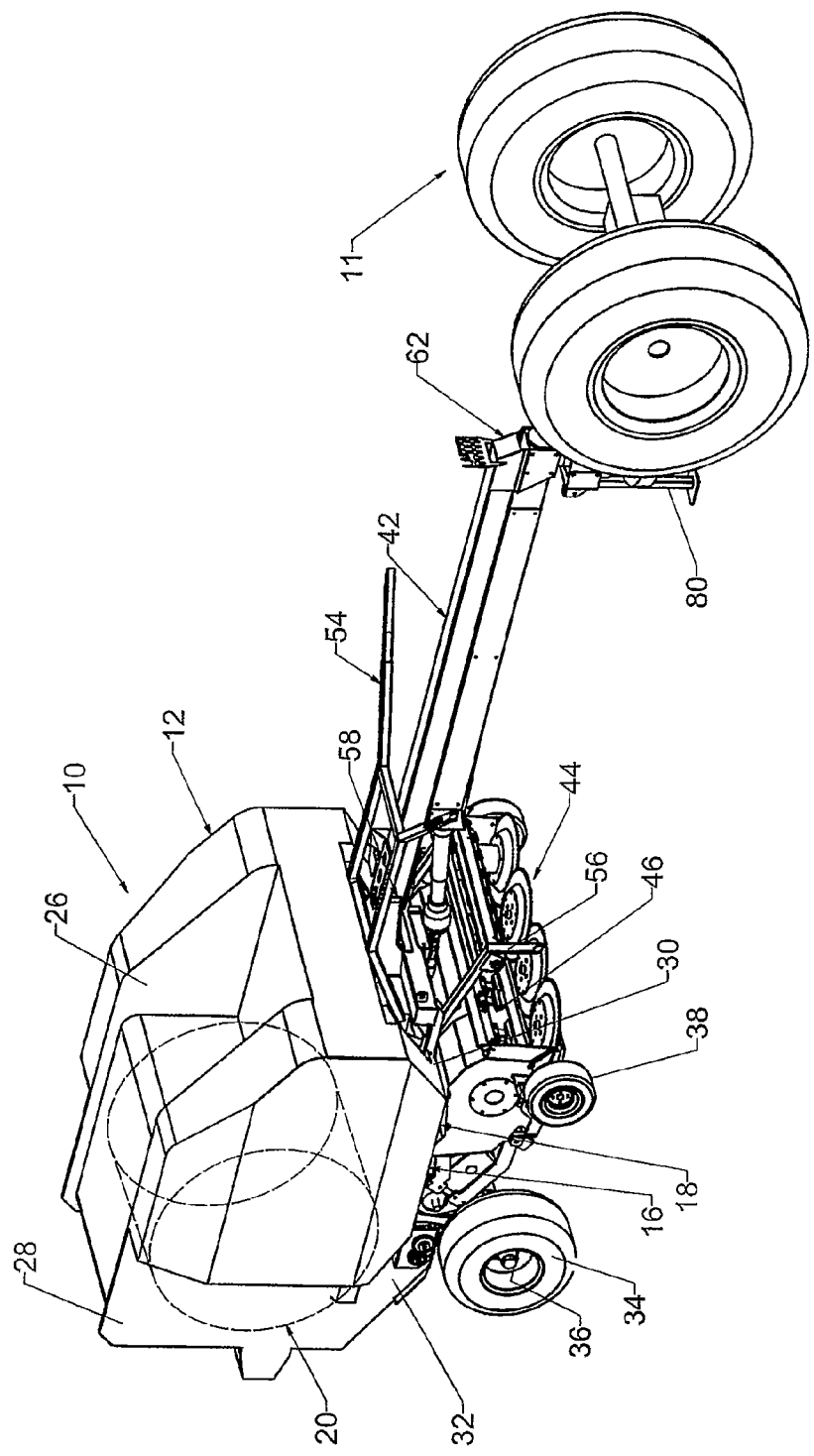
FIG. 1 is a perspective view from the front of a first embodiment of a harvester of the present invention having a housing in a close position.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as additional items.

Referring initially to FIGS. 1 to 5 of the drawings, there is shown a device 10 (referred to herein as a harvester) for harvesting crops having woody material according to a first embodiment of the present invention. The harvester 10 is attachable to a vehicle which can pull the harvester 10 and transmit the needed power to the harvester 10. Such a vehicle can be a conventionally known tractor 11.

The harvester 10 of the present embodiment is based on a conventional round baler which has been adapted to harvest woody crops. As known from conventional round balers, the harvester 10 includes a housing 12 having a housing frame 14 and an undersurface 16. The undersurface 16 of the housing has an opening 18 leading to an arrangement for feeding cut crops to a bale chamber 20 within the housing 12. The bale chamber 20 is of a variable type and is cylindrical, although this is not mandatory and the chamber 20 can equally be rectangular or square-shaped when it is required to form other bale shapes. The bale chamber 20 is provided with a baling (bale-forming) mechanism 22 for rolling crop to form a bale 24 which can comprise a suitable belt, roller and chain arrangement. The baling mechanism is a modified version of the mechanism known in the art of making hay bales from herbaceous crop and will be described below. The bale chamber 20 described in the present embodiment of the invention is a variable belt-type chamber, but other types of chambers (fixed chamber with rolls, fixed chamber with chains) are also suitable for the invention.

The housing 12 has a front portion 26 and a back portion 28. The back portion 28 is known in the art as a tailgate and is pivotally connected to the front portion 26. The tailgate 28 is moveable with respect to the front portion 26 of the housing 12 between a closed position and an open position to provide an exit for the formed bales 24 from the housing 12. This can be seen most clearly in FIG. 2. When the tailgate 28 is closed, it forms about half of the volume of the bale chamber 20. The front portion 26 of the housing 12 has a front end 30 and a back end 32. The housing 12 is supported mainly by a first pair of wheels 34 on a first axle 36 at the back end 32 of the front portion. A second pair of wheels 38 in front of the front end 30 of the housing 12 provides mainly a height adjustment to determine the horizontal level of cut of the woody crops. The harvester 10 is provided with a harvester gear box 40 (FIG. 5) for driving the harvester 10.

In accordance with a first embodiment of the invention, the harvester 10 includes an arm 42 for connecting the harvester 10 to the tractor 11; a processor which includes a cutter 44, a crusher 46, a cutter gear box 48 and a crusher gear box 50; a reinforcing frame 52 for reinforcing the housing to which the cutter 44 and the crusher 46 are connected; and upper and lower convergers 54, 56 for converging the woody crops at the front end of the harvester 10 to assist cutting. Further, the harvester 10 of the present embodiment excludes a hay pickup means which conventional balers have to provide space for the processor.

Figure 4:
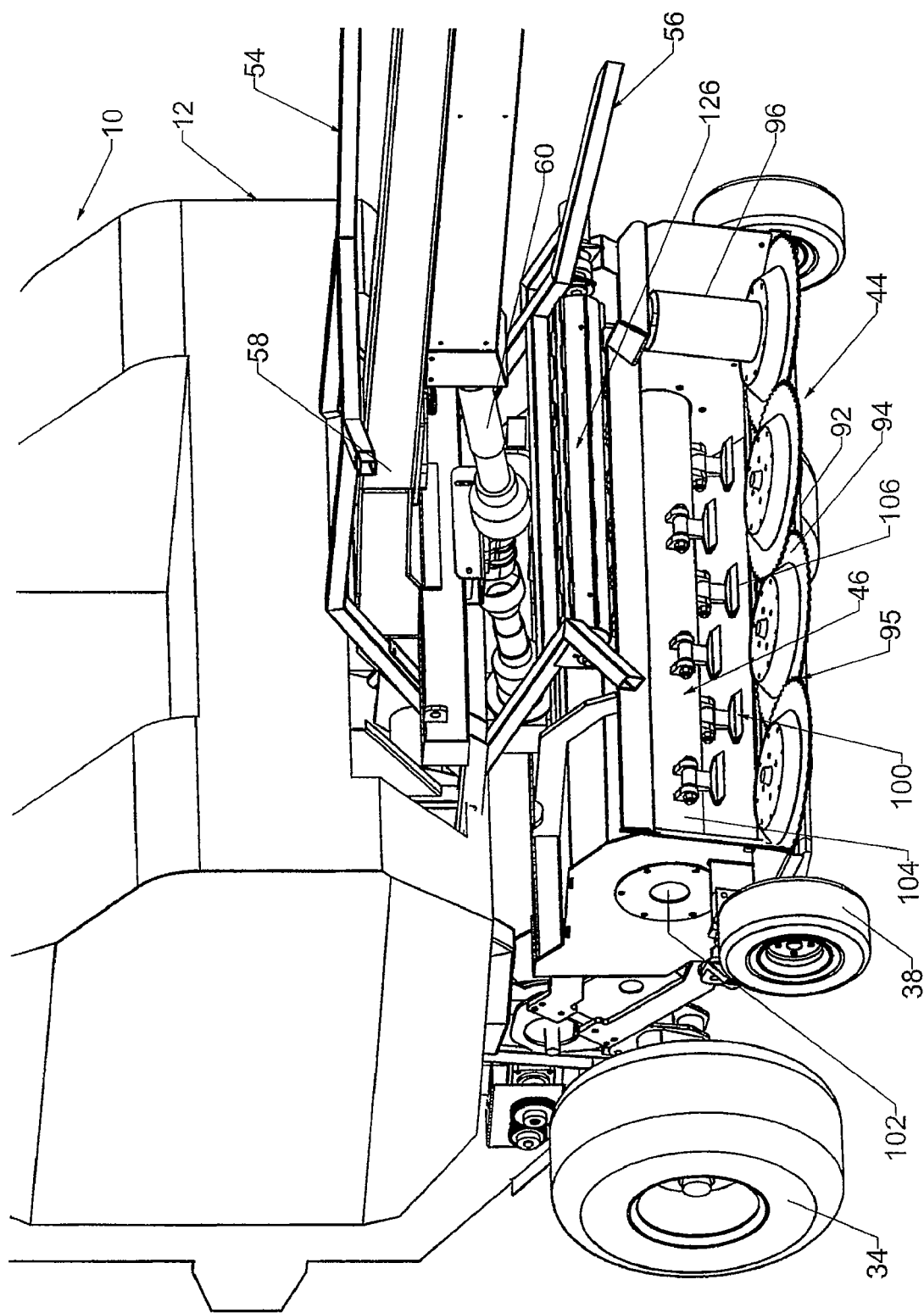
FIG. 4 is a close-up view of the front of the harvester of FIG. 1
Figure 5:
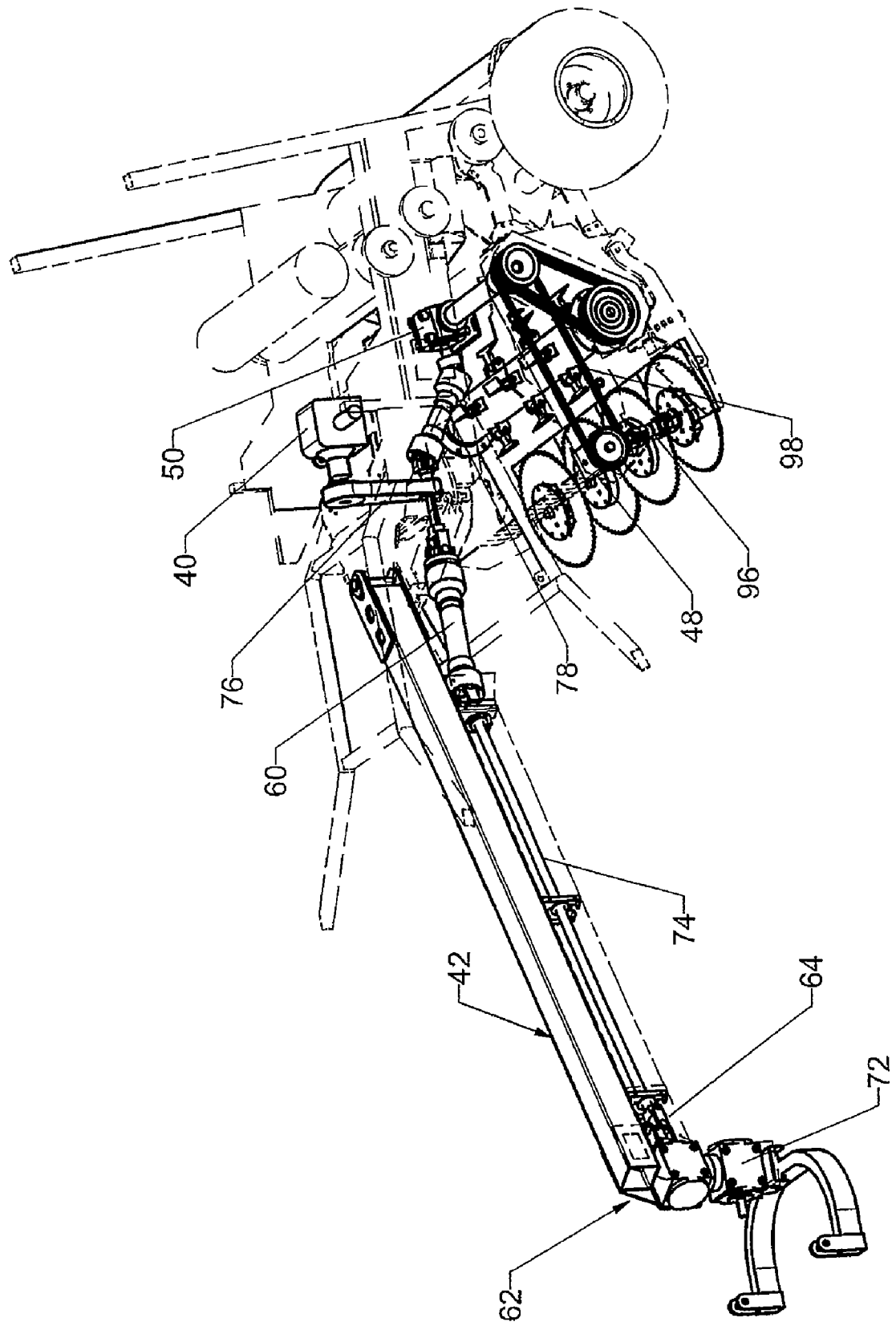
FIG. 5 is a close-up view of parts of the front of the harvester of FIG. 1.
Figure 6:
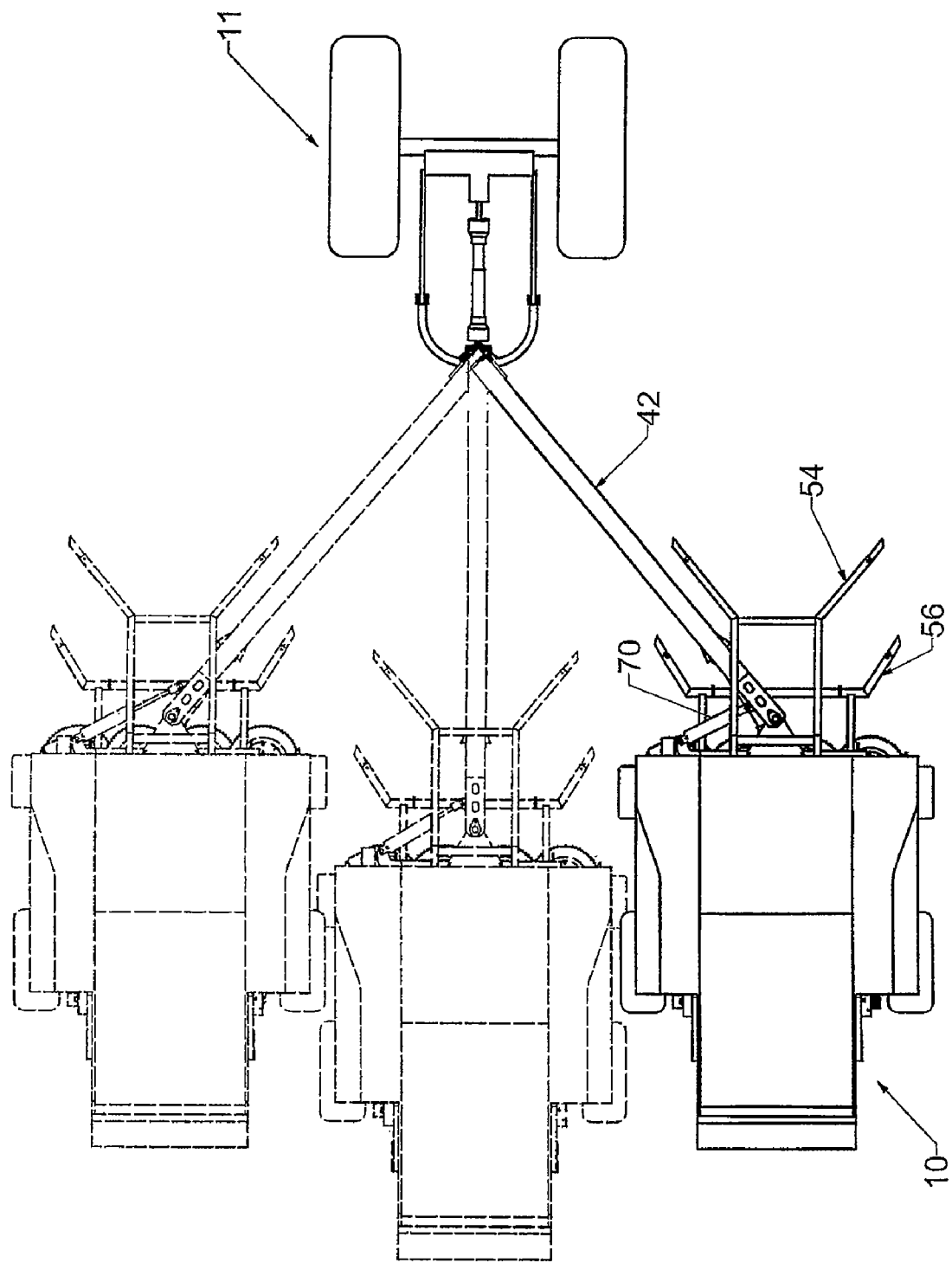
FIG. 6 is a top plan view of the harvester of FIG. 1 in two off-set positions and an aligned position.

Turning now to FIGS. 4-6 which show the arm 42 for connecting the harvester 10 to the tractor 11. In a conventional baler, a pivot tongue is provided for connecting the baler to a tractor. The pivot tongue is usually short and rigid so the tractor and the baler are connected close together and move along substantially the same line of travel thereby straddling over the herbaceous crop to be harvested. In the present embodiment, the arm 42 is in the form of an extended pivot tongue and replaces the short tongue of a conventional baler to allow the harvester 10 to be pulled in an offset position from the tractor's line of travel. The advantage of offsetting the harvester 10 from the tractor's line of travel is that the tractor can avoid trampling on standing woody crops before they are cut by driving on adjacent clear areas whilst the harvester 10 faces the woody crops. This can be most clearly seen in FIG. 6 where it is shown that the harvester 10 can be offset to either side of the tractor 11. The arm 42 also improves the maneuverability of the harvester 10, particularly in restricted areas like headlands.

Figure 7:
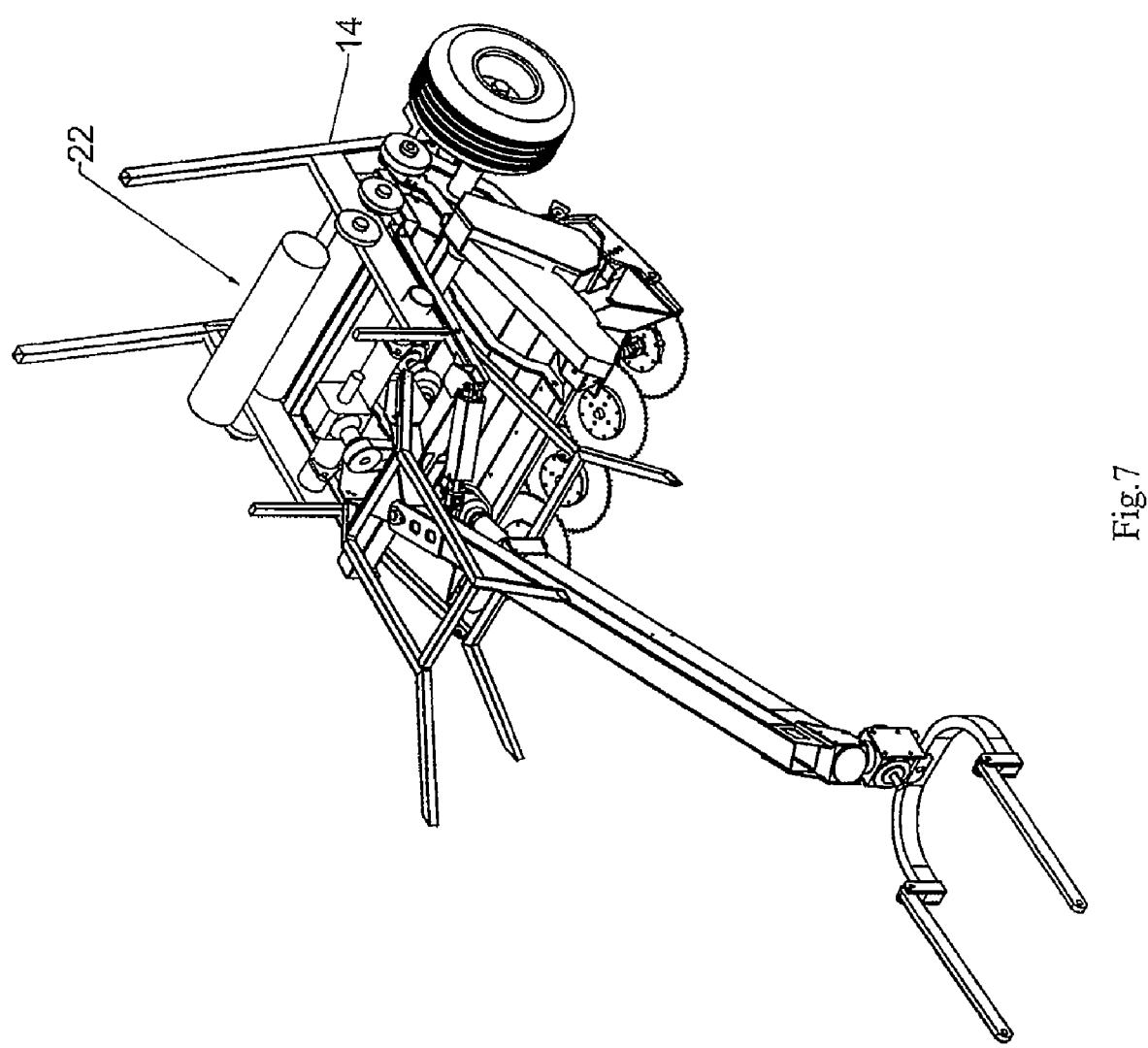
FIG. 7 is a perspective view of the harvester of FIG. 1 with the housing removed for clarity.

The arm 42 is rigid and has a first end (harvester end) 58 which is moveably connected to the harvester 10 and a second end (tractor end) 62 which can be moveably connected to the tractor 11. At the harvester end 58, the arm 42 is connected to a hitch 66 which is centrally positioned across a front end 68 of the reinforcing frame 52 which can be seen in FIGS. 7-9. A hydraulic cylinder 70 (FIG. 6) allows the harvester 10 to travel in an offset position from the tractor's line of travel.

Figure 2:
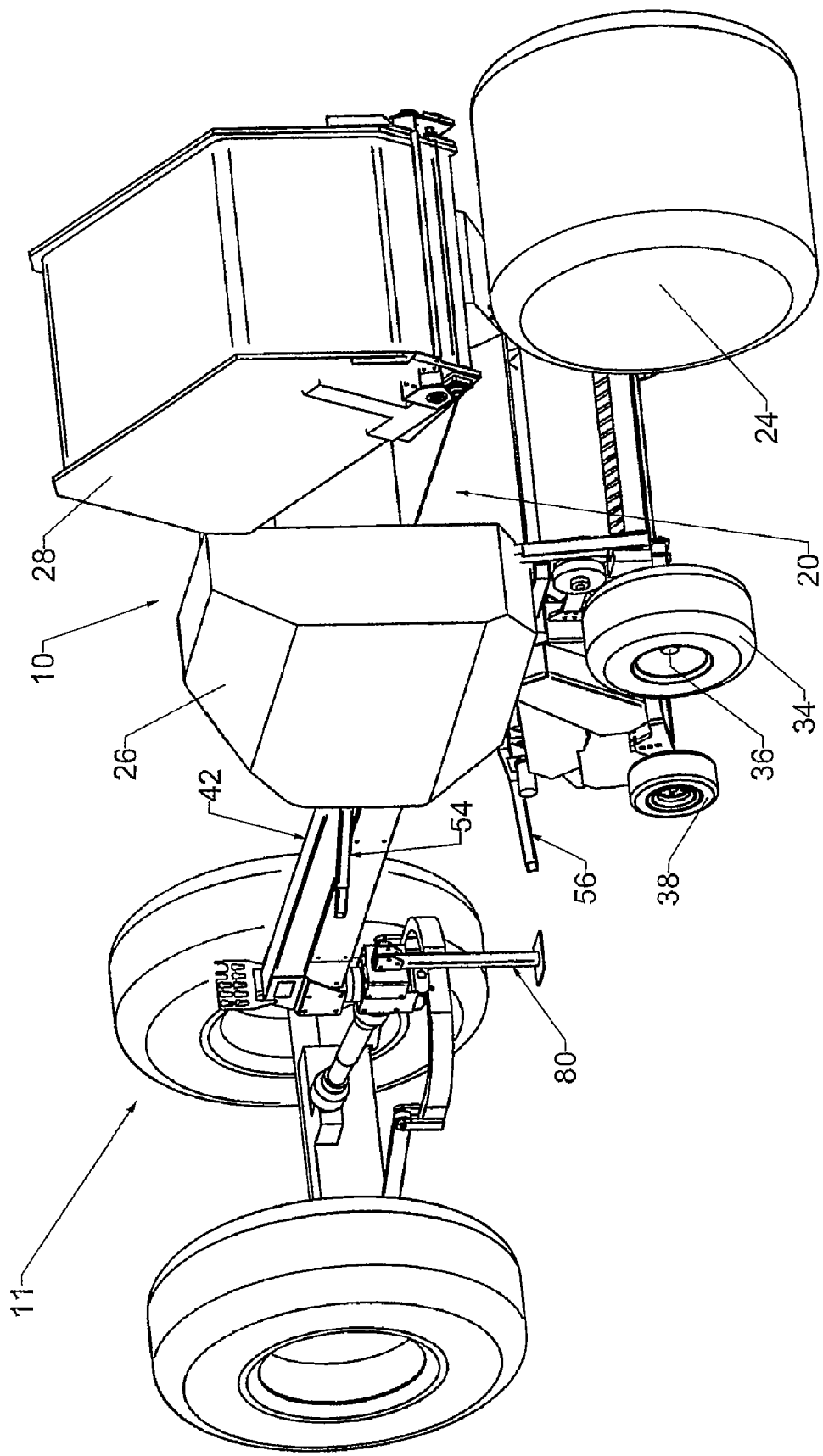
FIG. 2 is a perspective view from the back of a the harvester of FIG. 1 with the housing in an open position.

At the tractor end 62, the arm 42 is connectable to a swivel gear box 72 which is connected to the tractor's power takeoff shaft and its three-point hitch (FIGS. 2 or 6). These are known in the art of tractors and will not be described further here. Mechanical power is transmitted from the swivel gear box 72 along the arm 42 via a drive shaft 74 to the harvester, crusher and cutter gear boxes 40, 50, 48. The drive shaft 74 is connected to the harvester gear box 40 via a first double universal joint shaft 60 and a belt 76 in a manner known in the art. The drive shaft 74 is also connected to the crusher gear box 50 via the first double universal drive shaft 78 and a second universal double drive shaft 78, preferably with overrunning clutch in the second shaft 78.

Furthermore, as is known in the art, a jack 80 is provided at the tractor end 62 of the arm 42 to support the arm 42 when the harvester 10 is stationary.

Figure 8:
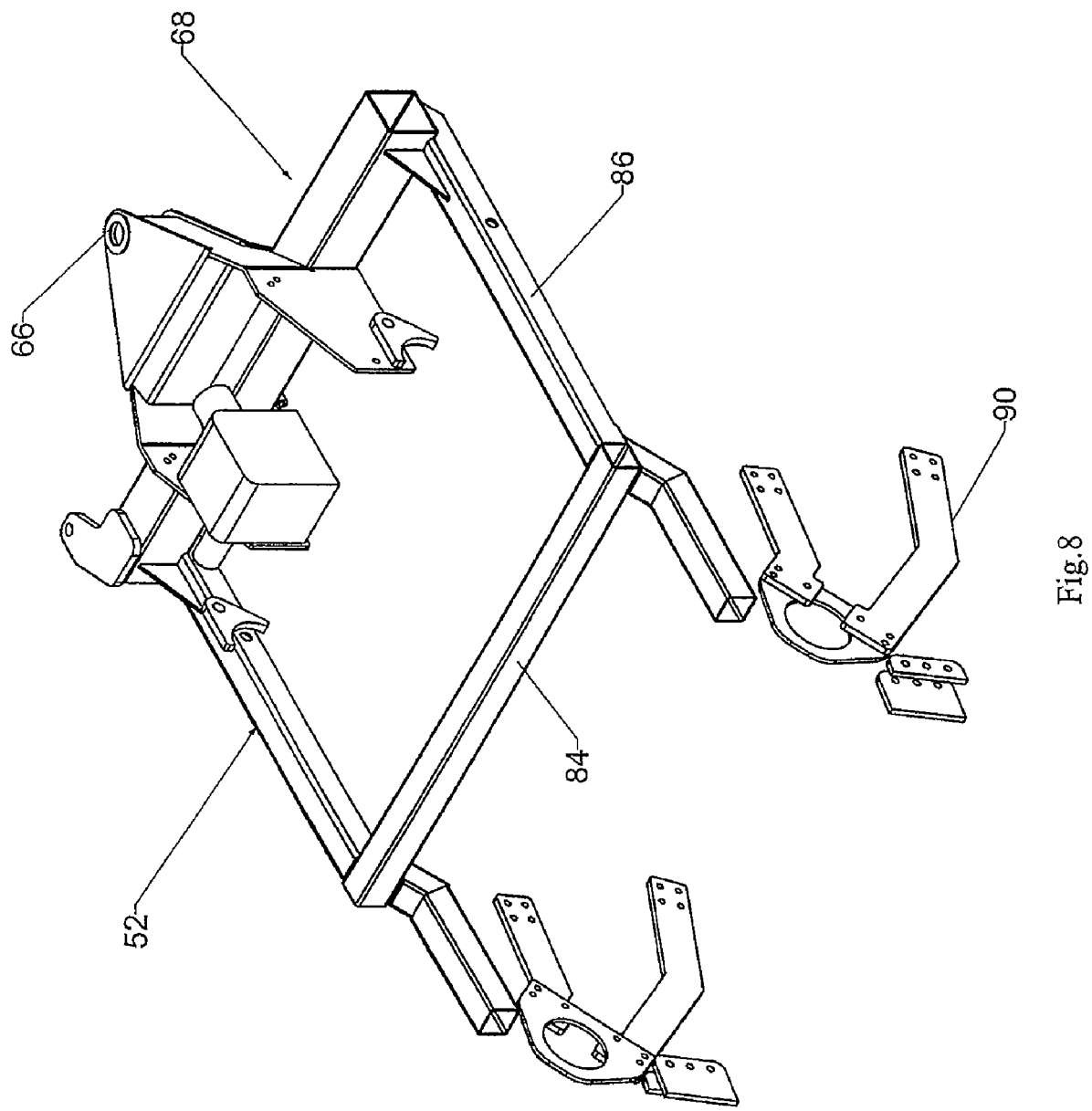
FIG. 8 is a perspective view of a reinforcement frame of the harvester of FIG. 1.
Figure 9:
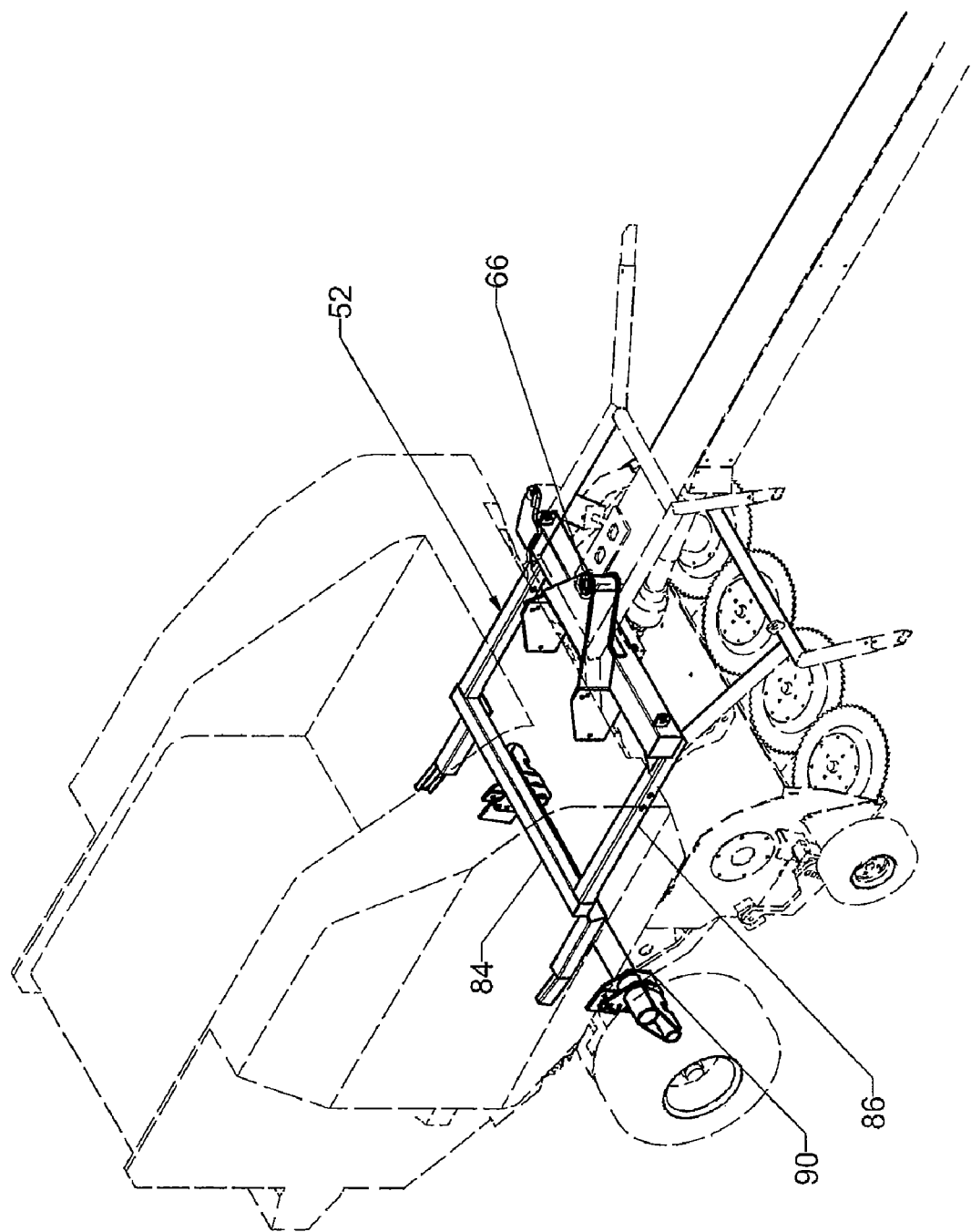
FIG. 9 is a perspective view of the reinforcement frame in position in the housing of the harvester of FIG. 1.

Referring now to FIGS. 8 and 9, the reinforcing frame 52 is shown which is connected to the housing frame 14 by appropriate welds and bolts (not shown). The reinforcing frame 52 is substantially rectangular and has front and back bars 82, 84 and two oppositely facing side bars 86, 88. Positioned rearwardly from the reinforcing frame is a support 90 for supporting the front end 30 of the housing. The position of this first pair of wheels 34 is more forward than in the conventional baler because the center of gravity of the harvester 10 is more forward with the additional weight of the cutter 44 and crusher 46.

Referring now to FIGS. 10 to 13 which show the cutter 44 and the crusher 46. The cutter 44 is located beneath both the housing frame 14 and the reinforcing frame 52 at the front end 30 of the front portion 26 of the housing 12. The crusher 46 is located rearwardly from the cutter 44. The cutter 44 is arranged to cut the stems of the standing woody crops at a suitable level above the ground from which they are growing. The cutter 44 is arranged to guide or feed the cut stem to the crusher 46 which compresses or shreds the stems to make them more pliable before they are fed to the bale chamber 20 for baling.

The cutter 44 comprises a cutter frame 92 including the second pair of wheels 38 which are ground driven. Four circular blades 94, preferably saw blades, are arranged substantially horizontally on the cutter frame 92 between the second pair of wheels 38. Each circular saw blade 94 rotates about its own axle on the cutter frame 92 and has an upper face, a lower face and a cutting edge in the form of teeth extending around the circumference of the blade 94. The blades 94 are aligned horizontally and spaced vertically such that a portion of the faces of each blade 94 overlaps without touching. The height of the blades 94 from the ground is adjustable.

As best seen in FIG. 5, the cutter gear box 48 is provided and is connected to one of the outermost blades 94 by a drive shaft 96. Power to the cutter gear box 48 is provided from the tractor 11 to which the harvester 10 is connected via the crusher gear box 50. A saw blade belt 98 connects the cutter gear box 48 to the crusher gear box 50. The rotation of the blades 94 is activated when the Power Take-Off (PTO) power from the tractor 11 is transmitted to the cutter frame 92 along the arm 42. This transmission can be controlled by an operator of the tractor 11 using an on/off controller (not shown) and a variable speed controller (not shown) in a two step process.

In operation, the four blades 94 function as two pairs of blades 94. Each blade 94 within a pair rotates towards the other blade 94 of the pair, the intersection between each pair of blades 94 defining a cutting point 95. Many advantages are related to the use of circular saw blades 94 for cutting the stems of the woody crops. One advantage is that they provide a neat and relatively horizontal cut, thereby protecting the stem stumps from bursting thus reducing water infiltration and pathogenic microorganism contamination. Another advantage is the relatively small amount of energy required to cut stems with saw blades 94 compared to other cutting means such as flail hammers 100, for example. However, one disadvantage with saw blades 94 is that they require more maintenance (e.g. sharpening, replacement) if rocks and mounds of soil are encountered frequently when cutting woody crops.

Figure 10:
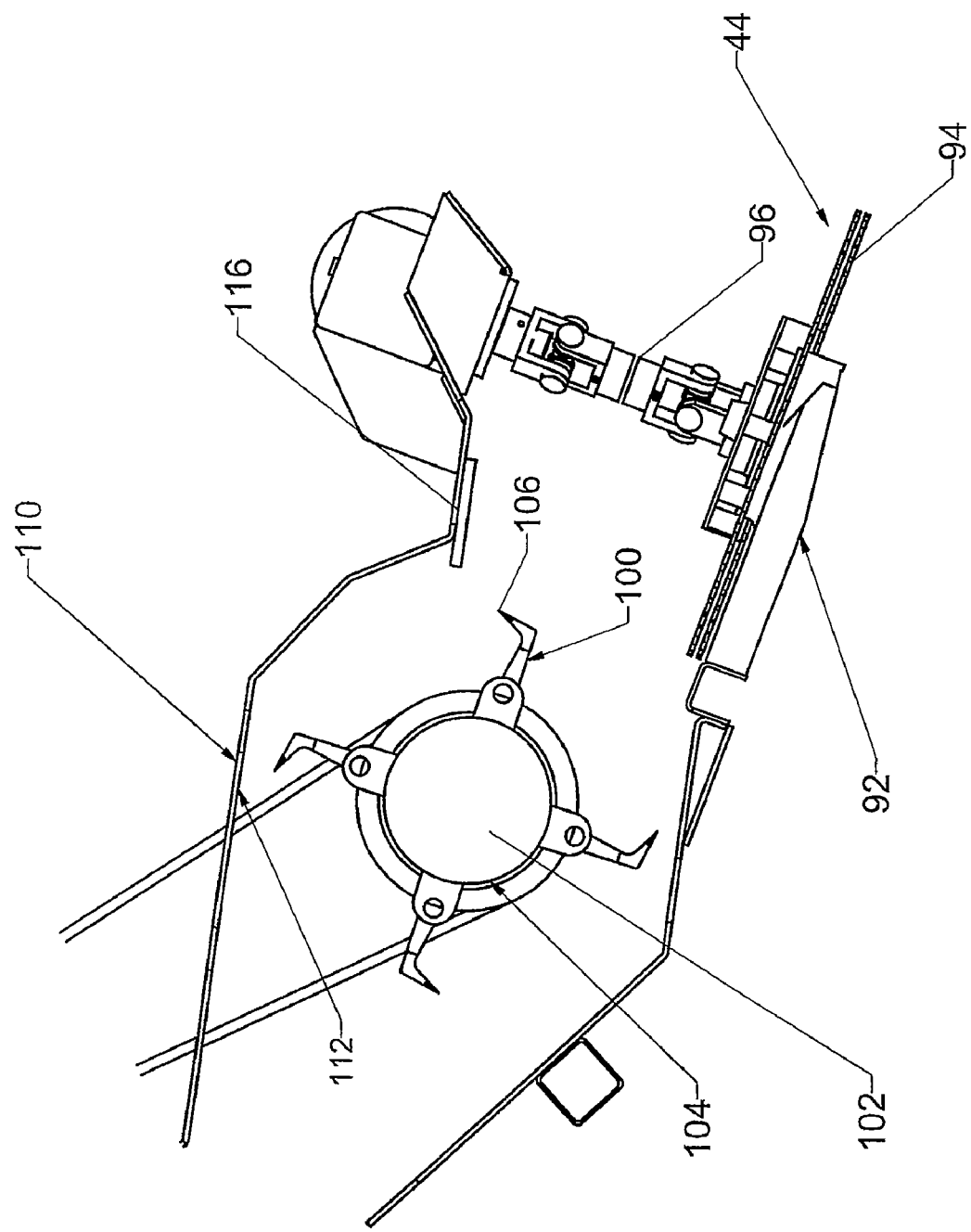
FIG. 10 is a perspective view of the processing arrangement of the harvester of FIG. 1 including a cutter and a crusher.
Figure 12:
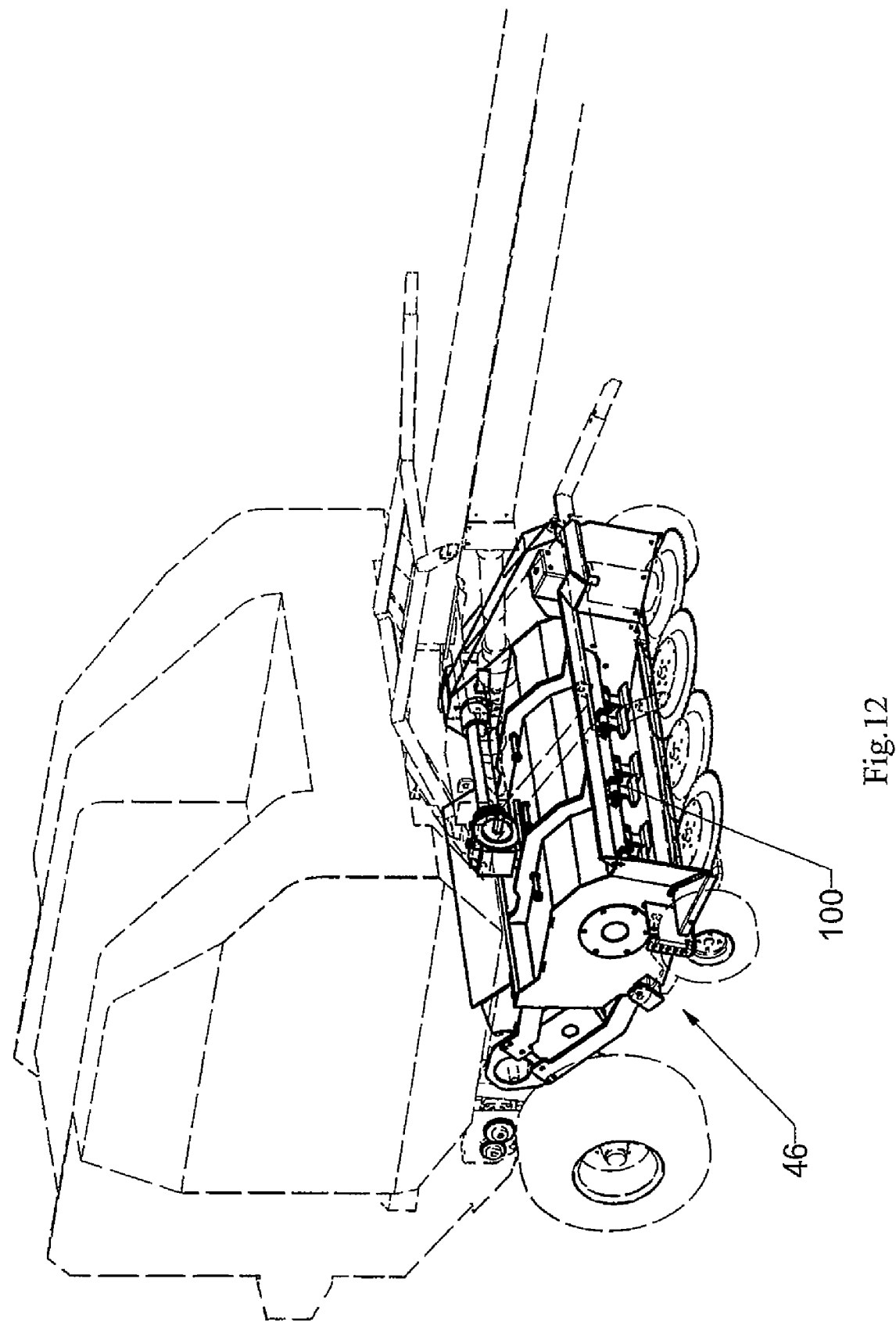
FIG. 12 is a perspective view of the crusher of FIG. 10.
Figure 13:
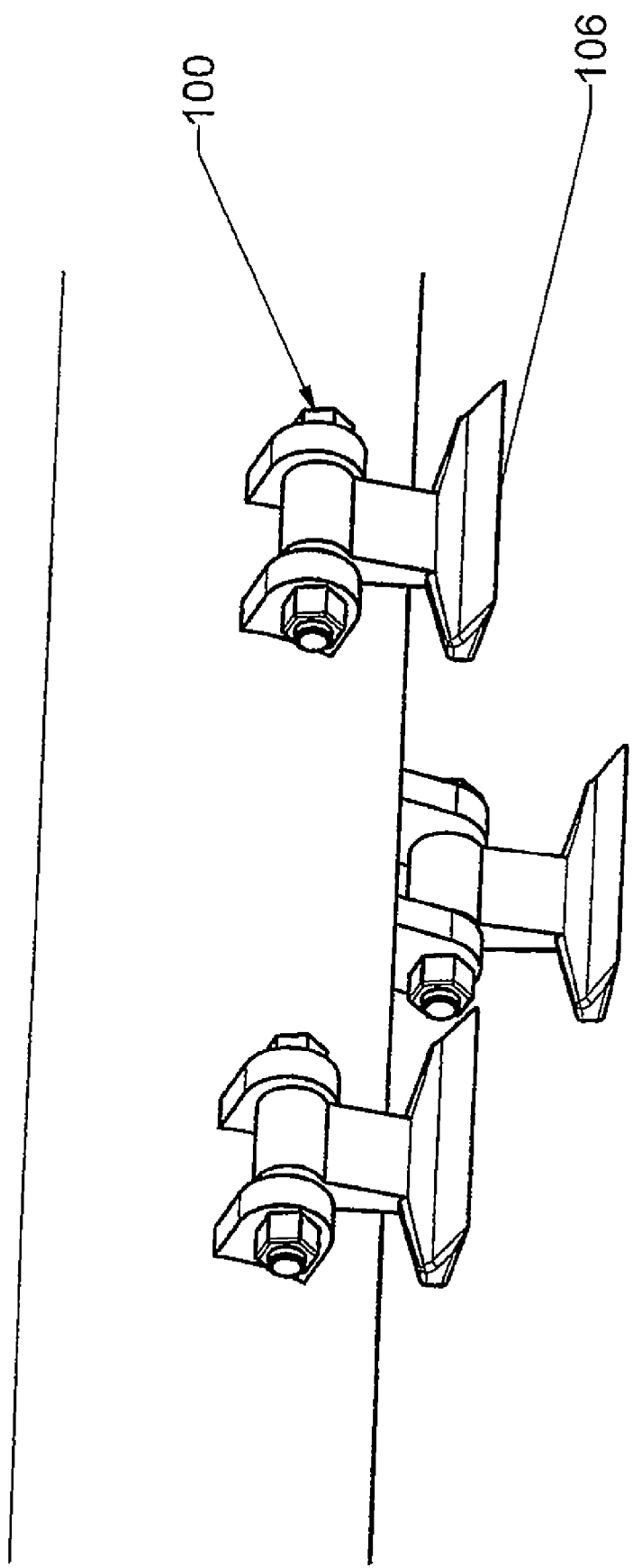
FIG. 13 is an enlarged view of the crusher of FIG. 10.

The main functions of the crusher 46 are to mechanically work the cut woody stems i.e. by shredding, crushing, lacerating, hacking, mangling, compressing etc. to make the stems more pliable; and to feed these stems to the bale chamber 20 in a continuous manner. The crusher 46, as best shown in FIGS. 10, 12 and 13, comprises a cylindrical rotor 102 having a rotor surface 104. A plurality of hammers 100, preferably flail hammers, are connected to and spaced along the rotor surface 104. Each flail hammer 100 has a hammer head 106 having a crushing surface for crushing or compressing the cut woody stems and a cutting or gripping edge for shredding, lacerating, hacking, mangling or gripping the cut woody stems. Each flail hammer 100 is pivotably connected to the rotor surface 104, preferably by a hinge-type connector. When the rotor 102 rotates (anticlockwise as shown in FIG. 10), the flail hammers 100 extend away from the rotor surface 104 to define a shredding zone 108 within which the cut stems can be shredded and compressed by the hammer heads 106. The rotor 102 is housed in a rotor housing or hood 110 having an inner surface 112, a portion of which faces a portion of the shredding zone 108 and is spaced from the shredding zone 108.

In operation, the cut woody stems are compressed or shredded against the plate inner surface 112 while being dragged or pulled by the motion of the rotor 102 and the hammer heads 106 across the plate inner surface towards the bale chamber 20. The space between the shredding zone 108 and the plate inner surface 112 defines a crushing zone 114 and this space is adjustable by an adjustor 116 to control the amount of woody stems entering the crushing and shredding zones 114, 108 and ultimately to control the extent of crushing. Preferably, the adjustor 116 is a plate whose distance from the rotor 102 can be adjusted. As the woody material is fed through the crushing zone 114, it is the narrowing of the crushing zone 114 together with the rotation of the rotor 102 which compresses the woody material against the plate inner surface 112. The crushing action breaks up the woody stems to make them more pliable before they enter the bale chamber 20 without substantially fragmenting the woody stems to produce woody chips. The shredding and crushing actions can be obtained with other devices capable of pulling, lacerating and feeding continuously the woody crops towards the bale chamber 20. Besides the flail hammers 100 on a rotor 102, other such devices include fixed hammers on a rotor, flail or fixed knives on a rotor, or intermeshing conditioning rolls.

The bale chamber 20 of the harvester 10 of the present embodiment has been adapted to include a single wide belt 118 instead of multiple narrow belts to constrain the crushed woody stems within the bale chamber 20. The single wide belt 118 forms a regular cylindrical surface which prevents woody stems protruding from the bale chamber 20 as may occur between the gaps of standard multiple narrow belts of conventional balers. The single belt 118 also reduces the amount of woody biomass (e.g. leaves and stems) lost through the gaps between the multiple belts. In the bale chamber 20, the harvested material is then formed into a compressed bale 24 which incorporates the crushed stems of whole woody plants. The bale 24 can be ejected from the bale chamber 20 once the bale 24 diameter reaches a predetermined size or when the operator of the tractor 11 chooses. Typically, the bale 24 is ejected once its diameter reaches between 0.9 m and 1.5 m.

Figure 3:
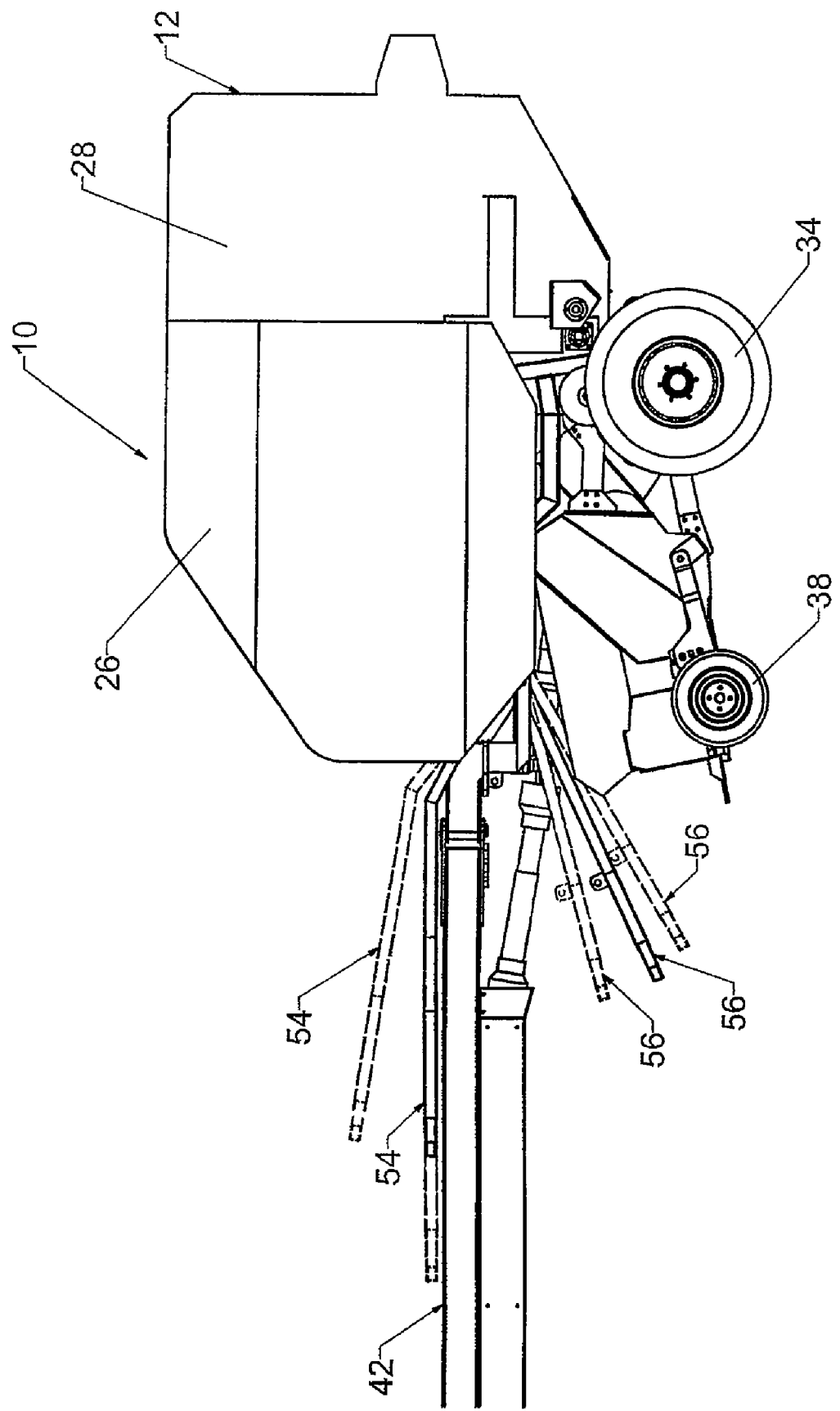
FIG. 3 is side view of the harvester of FIG. 1.
Figure 14:
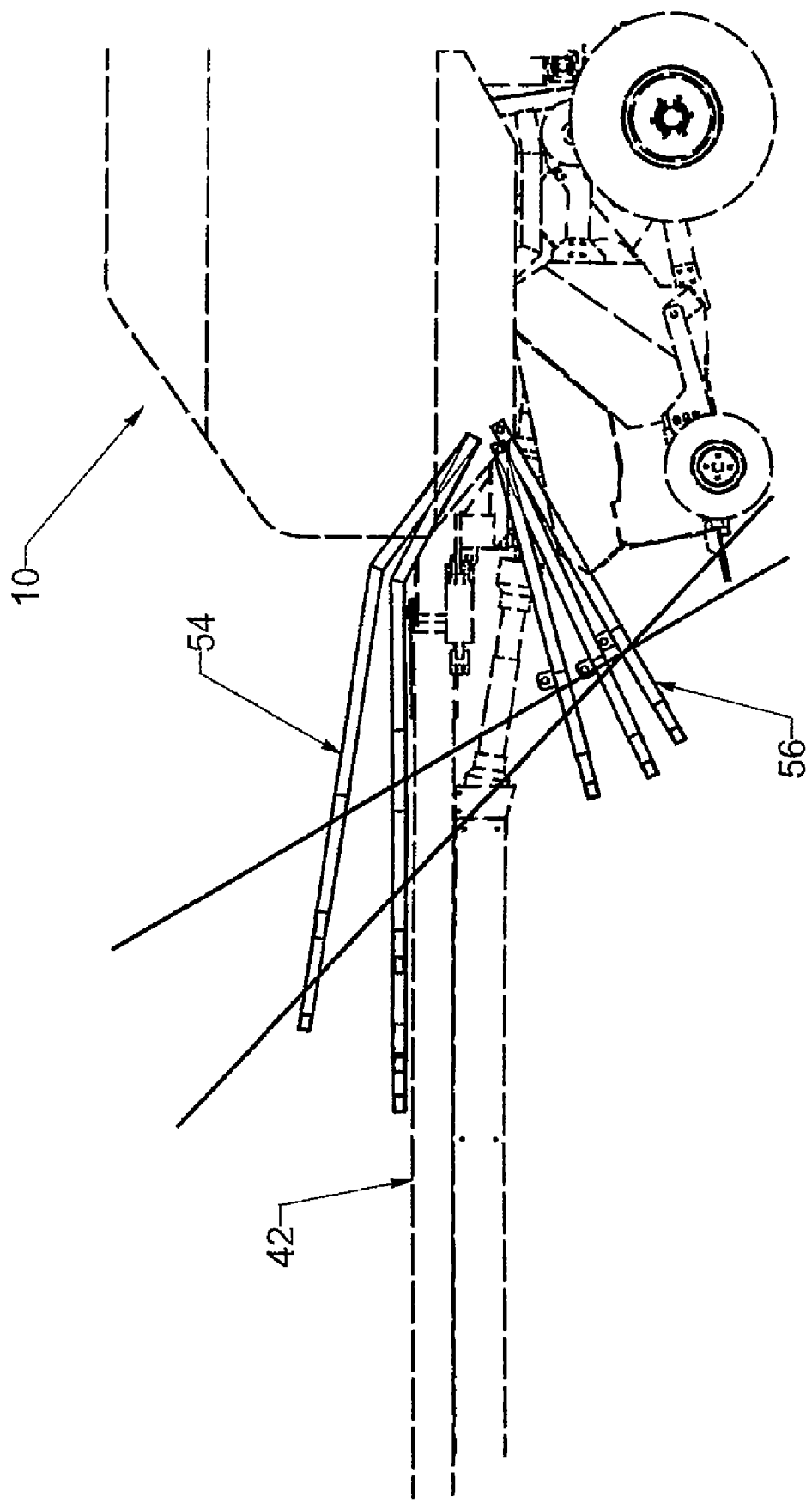
FIG. 14 is a perspective side view of the push bars of the harvester of FIG. 1.
Figure 15:
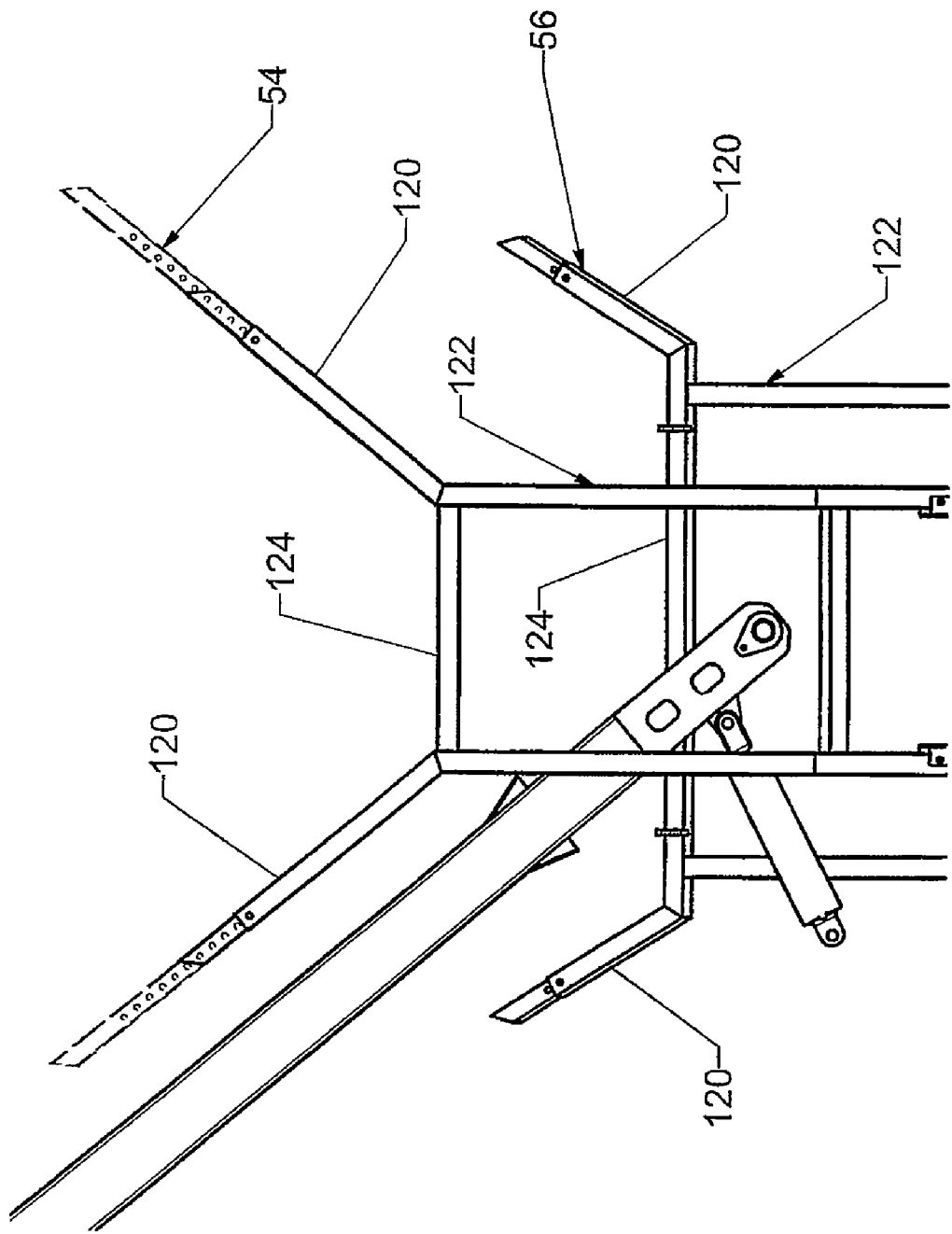
FIG. 15 is a top plan view of the push bars of FIG. 14.

Guiding of the crops to the device for cutting of their woody stems is assisted by the upper and lower convergers 54, 56, shown in FIGS. 3, 14 and 15. Similar bars are known in the art as push bars. Each push bar 54, 56 is essentially a pair of diverging bars 120 extending from the housing frame 14 and spaced from the housing frame 14 by a spacer 122. A cross bar 124 connects the diverging bars 120 to each other and to the spacer 122 to form a truncated V-shape. The truncated V-shape of the diverging bars 120 has the effect of gathering together, bunching or converging the upper part of woody stems to guide or feed them towards the cutting points 95 of the cutter 44. The spacer 122 protects the front end 30 of the housing 12 from impact with the woody crops. The upper push bar 54 is positioned above the moveable arm 42 and the lower push bar 56 is positioned beneath the moveable arm 42 but above the woody crop processor. The heights of the push bars 54, 56 are adjustable according to the heights of the woody crops to be harvested. As well as their vertical position adjustment, the horizontal position of the push bars 54, 56 can be adjusted. The upper push bar 54 is spaced further from the front of the housing 12 than the lower push bar 56. The effect of this is to change the vertical position of the woody stems into an inclined position to cut the woody stems. Immediately after cutting, the stems are further inclined towards a horizontal position to facilitate feeding of the stems to the crusher 46.

A feed roll 126 (FIG. 4) consisting of a hydraulically driven rotor with small paddles may replace the cross bar 124 of the lower converger 56. This lower feed roll 126 inclines the stems from their vertical position towards a horizontal position during cutting. Such a feed roll 126 can minimize the chances of jamming the cutter 44 and improve guidance of the cut stems to the crusher 46.

In operation, the harvester 10 operates in two different modes: a harvesting mode and a bale ejecting mode. In the harvesting mode, the tailgate 28 is in the closed position (FIG. 1). The woody stems are caught within the push bars 54, 56 and brought towards the cutting points 95 of the saw blades 94. The rotating saw blades 94 cut the woody stems which are then guided towards the crusher 46. The combined effect of the double push bars 54, 56 with the continued forward movement of the harvester 10 has the effect of moving the lower part of the cut stems upwardly and the upper part of the stems downwardly such that the entire stem inclines towards a horizontal position. The woody stems are grasped or gripped by the cutting edges of the hammer heads 106 or the hammer heads 106 themselves which pull or drag them through the crushing zone 114 as the rotor 102 rotates. In the crushing zone 114, the shear force generated by the movement of the woody stems against the inner surface of the hood 112 compresses the cut woody stems to increase their pliability. The crushed woody stems are fed into the bale chamber 20 where they are formed into round bales 24. Once the bale 24 is formed and reaches the desired dimension, it is wrapped or tied with conventional net wrap or baler twine by a binding mechanism (not shown) to maintain its volumetric integrity and to facilitate subsequent handling. The harvester 10 is switched into the bale ejecting mode in which the tailgate 28 is moved to the open position to eject the bale 24 from the bale chamber 20. The bales 24 can be dropped on the ground individually behind the harvester 10, or placed on a trailer or trailing wagon (not shown) to accumulate and be dropped as a group of several bales 24 by an unloading mechanism (not shown). Bales 24 can also be displaced laterally with a side unloading or displacer arm (not shown) extending from the device to avoid hindering subsequent movement of the harvester 10 on adjacent crop rows.

Figure 16:
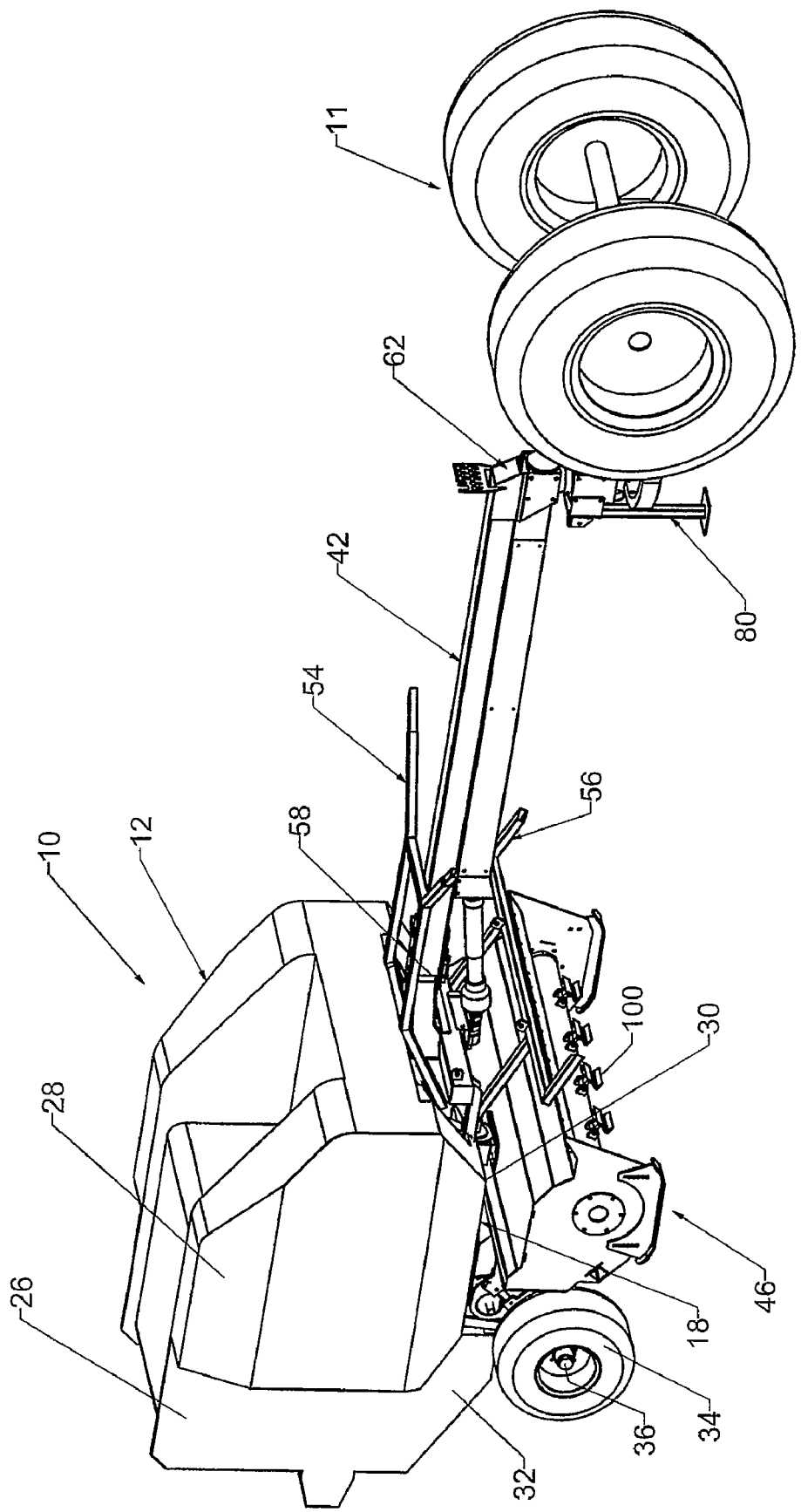
FIG. 16 is a perspective view of a second embodiment of the harvester of the present invention.
Figure 17:
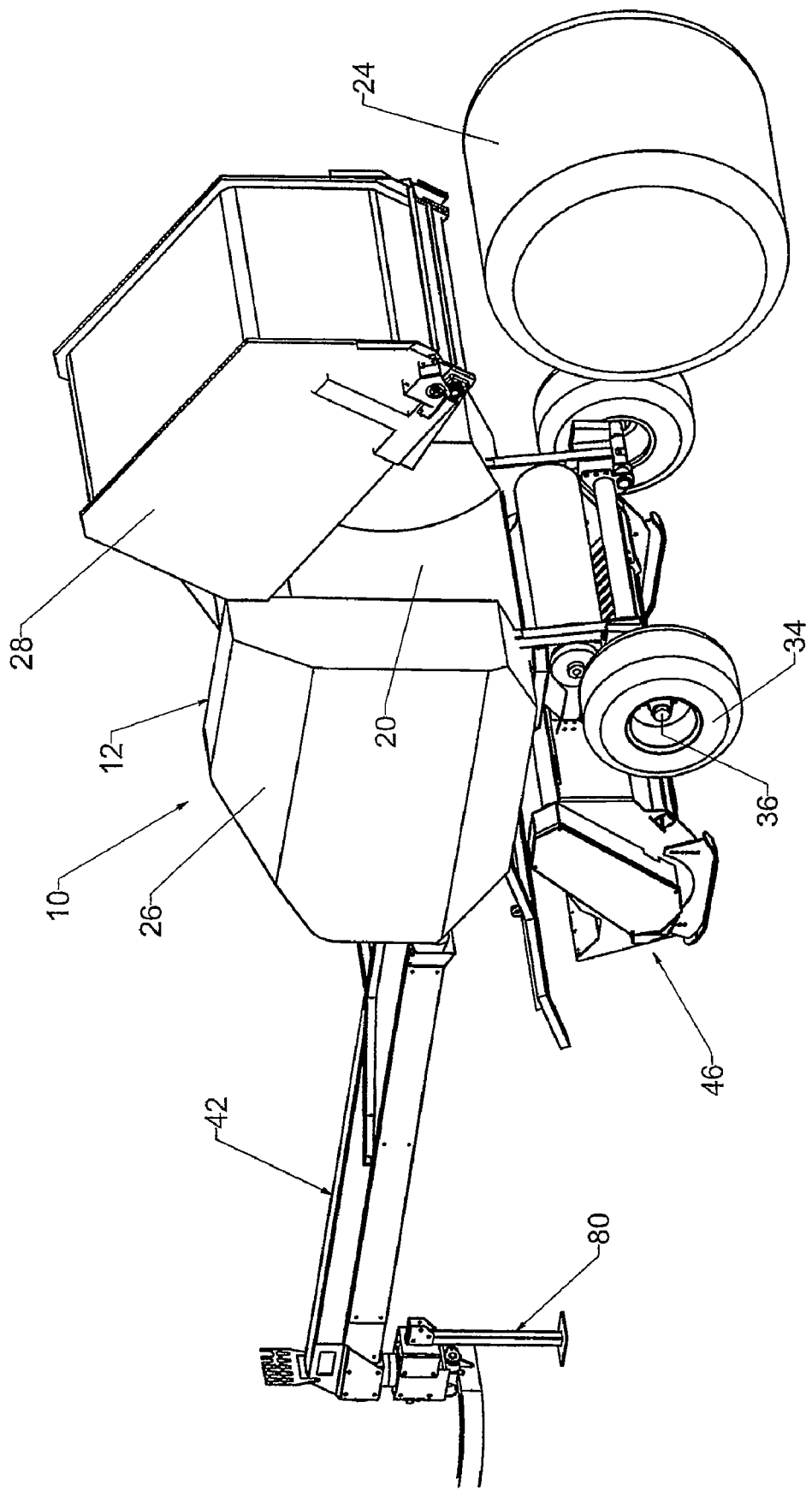
FIG. 17 is a perspective view from the back of the harvester of FIG. 16 when its housing is in an open position.
Figure 18:
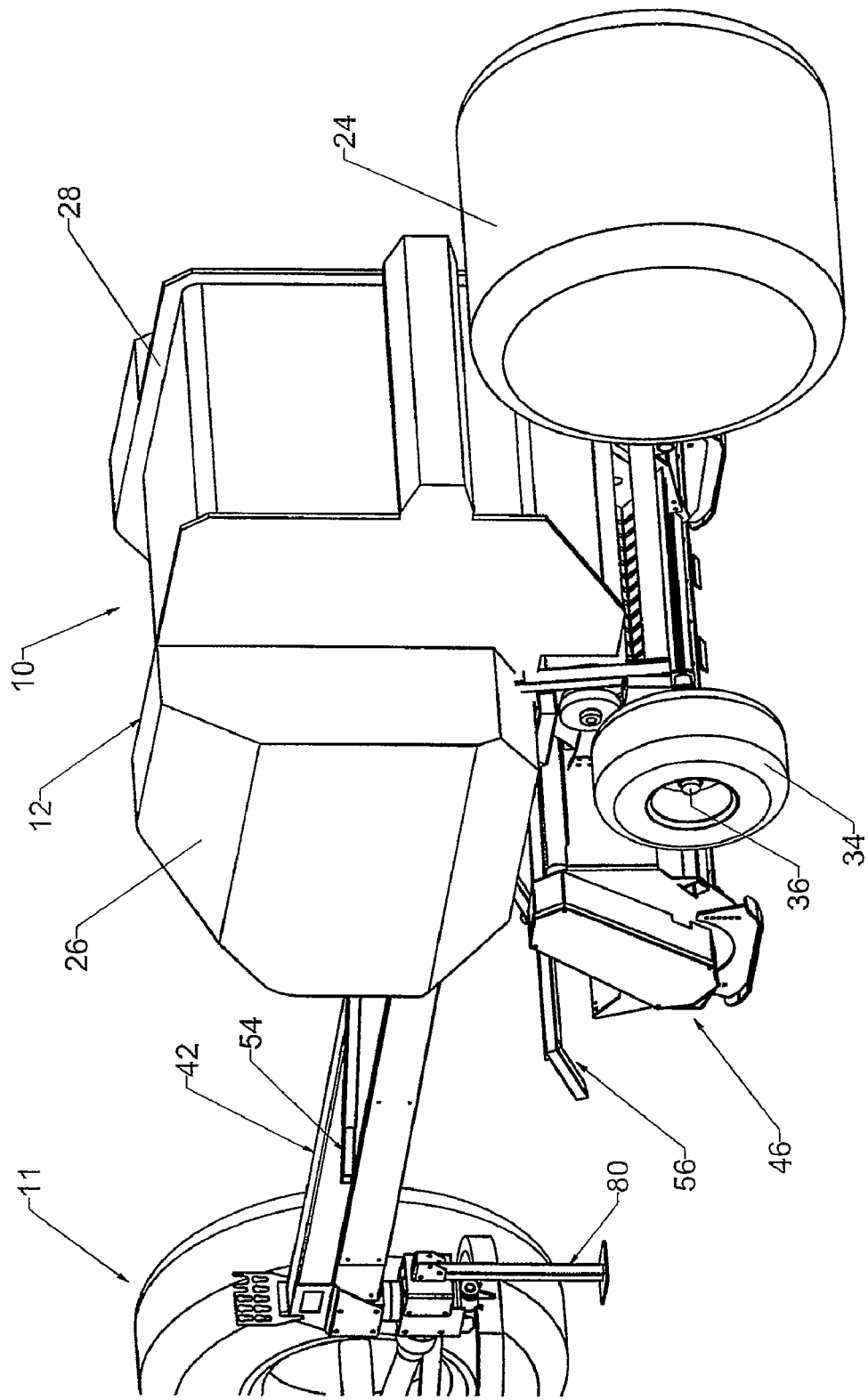
FIG. 18 is a perspective view from the back of the harvester of FIG. 16 when its housing is in a closed position.

A second embodiment of the harvester 10 of the present invention is illustrated in FIGS. 16-18. The harvester 10 of this embodiment differs from that of FIGS. 1-15 in that the processor includes only the crusher 46. In other words, the cutter 44 and the second pair of wheels 38 are absent from this second embodiment. The crusher 46 functions as both a cutter 44 and a crusher 46. The hammer heads 106 of this second embodiment may differ from those of the first embodiment in that they can be wider and heavier than those of the first embodiment. Also, there are more hammers 100 extending from the rotor surface 104 in the second embodiment than in the first embodiment. This enables the hammer heads 106 of the second embodiment to have an increased cutting, shredding and compressing effect.

This second embodiment is well adapted to harvest woody crops which are randomly distributed and when bumps and rocks might be encountered and might potentially damage saw blades. It will be understood that this second embodiment is also adapted to pick up woody crops which have been previously cut in a separate operation.

EXAMPLE

The harvester 10 of the present example was designed and developed for harvesting willow. A round baler having a variable compression chamber (BR 740, CNH, New Holland, Pa.) was adapted as described above, to form the harvester 10 of the present invention. A round baler was used as the starting point of the invention because of its relatively low cost, and for its low power requirement (in the range of 60-65 hp for herbaceous crops). The round baler is also relatively light and provides good flotation on soft soils. Specifically, the round baler's hay pickup and twine wrapping system were removed to increase space under the baler where the cutter 44 and crusher 46 were positioned. The net wrap system of the round baler was used to tie bales. The first wheel axle 34 of the baler was moved forward about 350 mm to improve the harvester's 10 weight distribution as the crusher 46 and cutter 44 added an extra 800 kg in front of the baler. The six narrow belts of the baler were replaced by a single full length belt 118 (3-ply Diamond Top belt) of 1143 mm width by 8.5 m length. The frame 14 of the baler was reinforced with a reinforcing frame 52 to support the extra weight of the woody crop processor.

The original tongue of the round baler was replaced by an extended pivot tongue (arm 42) of 3.66 m in length to pull the harvester 10 either along the tractor's 11 line of travel or in an offset position. A hydraulic cylinder 70 allowed offsetting of the harvester 10 by up to 2.35 m (by 40°) on each side of the tractor's 11 line of travel. The tractor end 62 of the extended pivot tongue was equipped with a swivel gear box 72 (Gehl model 3512).

Figure 11:
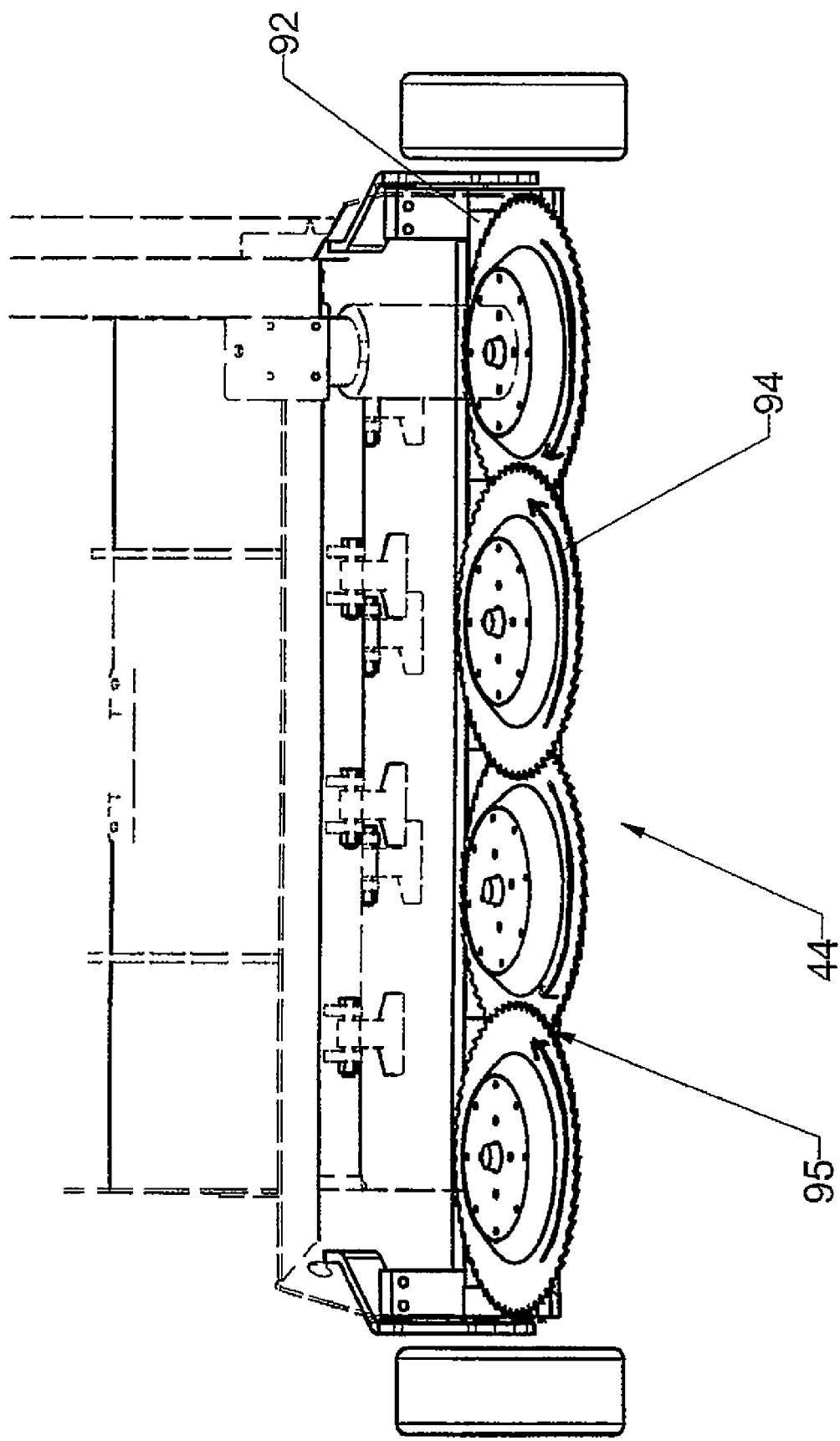
FIG. 11 is a front perspective view of the saw blades of the cutter of FIG. 10.

The cutter 44 consisted of four disk mower modules (John Deere, low-profile modular cutterbar) which were modified to receive four 560 mm diameter saws 94. These modules were chosen because of their small thickness which minimized the inclination angle (about 13° from the horizontal plane) to neatly cut willow stems close to the stumps. The distance center-to-center was 457 mm between each pair of saws 94 and 495 mm between the two pairs. The horizontal overlap was 103 mm within a pair of saws 94 and 65 mm between the two pairs. The vertical offset between the saw blades 94 was 9.5 mm. The saws 94 were made from 4.75 mm thick steel sheet and the shape of teeth formed by laser cutting. Each original saw blade 94 had 60 teeth. In use, the tangential cutting speed (tip speed) was 88 m/s at a saw rotational of 3000 RPM. The saw blade 94 height was adjustable between 100 mm and 400 mm above the ground. A second pair of wheels 38, of adjustable height, were provided one on each side of the four saw blades 94, as shown in FIG. 11. The total cutting span of the four saw blades 94 was 1.97 m and the distance centre-to-centre between the two furthest blades 94 was 1.41 m.

The crusher 46 was a 1.5 m long rotor 102 having 12 hammers 100 (Orsi Model WHO 1550, Italy). Each hammer 100 weighed 1.7 kg and was 150 mm wide. The rotor 102 diameter was 200 mm and the hammers' 100 rotating diameter was 450 mm. The hammers 100 were located at about 125 mm center-to-center from each other with a 90° angular offset. The rotor 102 speed was 2200 RPM. The peripheral speed of the hammer 100 was about 52 m/s. The PTO power was partitioned into the swivel gearbox 72 and was distributed to the cutter 44, the crusher 46 and the harvester 10. PTO speed was 1000 rpm and was reduced to 540 rpm for the harvester 10.

The widest distance between the diverging bars 120 of the upper push bar 54 was 2.1 m. The push bars 54, 56 are adjustable vertically as shown in FIGS. 1, 14 and 15.

The harvester 10 was used to harvest willow rows 1.5 m apart, one row at a time, and also willow rows 0.75 m apart, two rows at a time. However, the invention is not limited to harvesting willow, or rows of woody crops at a fixed distance apart. In fact, the invention can be used to harvest other woody crops planted with varying row distance apart and also naturally growing woody crops which are not necessarily in rows. The tractor 11 towing and powering the harvester 10 operated at a forward speed of about 1 to 3 km/h but was adjusted to the crop yield and sometimes to the available tractor power. The wet mass and moisture content of willow bales 24 harvested using the harvester 10 of the present invention was investigated. Bales 24 were weighed on a platform scale (1000 kg full range; precision +/−0.2 kg). To measure moisture content, three willow stems were selected randomly along a row just prior to harvest of each bale 24 and cut with a manual saw. Each stem was cut in small pieces of about 100 mm long, put in an open container and placed to dry in an oven at 103° C. for 24 hours or until the weight became constant. Moisture was estimated as the ratio of weight loss (evaporated water) over the original wet weight of the woody crop sample. Moisture is always reported as an average of moisture from several bales 24 harvested under similar conditions.

Figure 19:
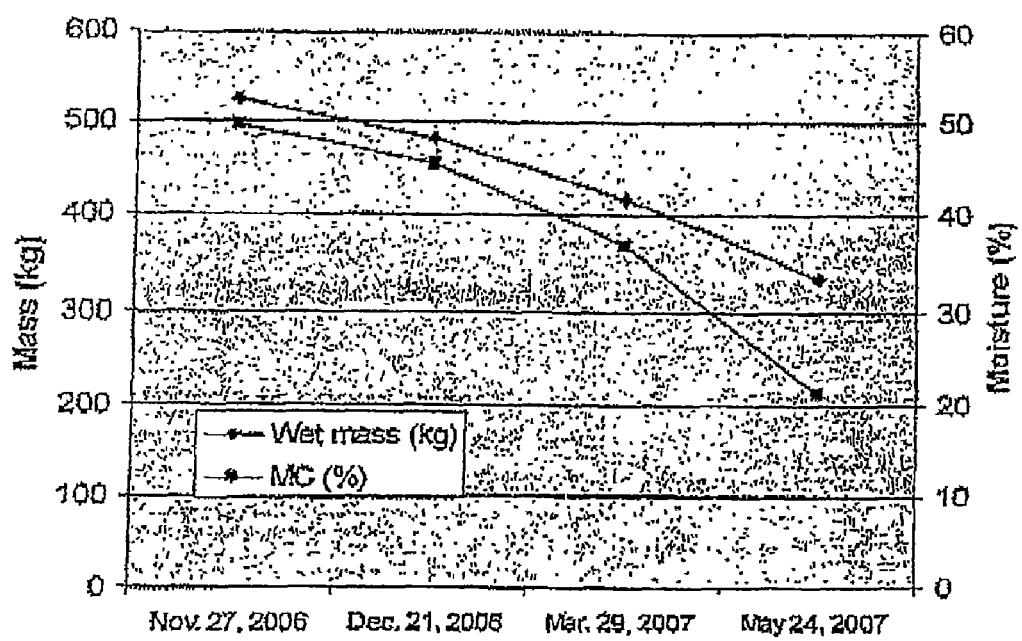
FIG. 19 is a graph illustrating the wet mass and moisture content of willow bales harvested using the harvester of FIG. 1 which were stored under shelter without heating.
Figure 20:
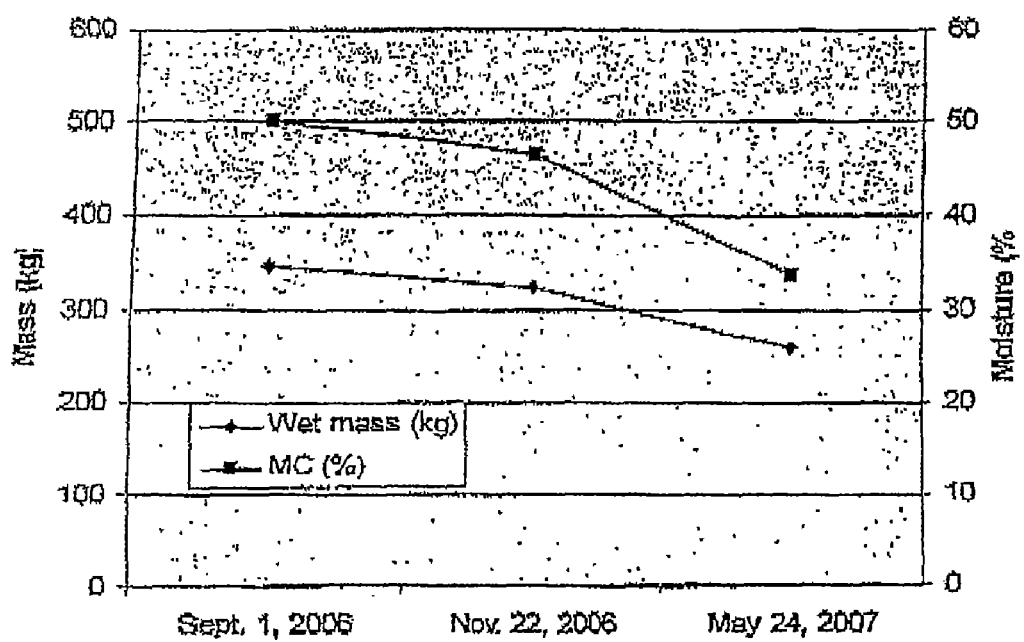
FIG. 20 is a graph illustrating the wet mass and moisture content of willow bales harvested using the harvester of FIG. 1 which were stored outside.

An advantage of harvesting woody crops in the form of bales 24 is the natural aeration and water evaporation during storage. FIGS. 19 and 20 show the loss of wet mass and moisture content during storage. Four large (1.40 m diameter) and dense (140 kg dry matter/$m^3$) bales 24 were stored inside for six months, in an unheated greenhouse. FIG. 19 shows that the average wet mass decreased from 523 to 325 kg, and the moisture content from 49.6 to 21.2% (wet basis). Seventeen smaller (1.27 m diameter) and less dense (112 kg DM/$m^3$) bales were stored outside for almost 9 months from September to May, excluding the warmer summer months. FIG. 20 shows that the average wet mass decreased from 346 to 263 kg, and the moisture content from 50.0 to 33.6% (wet basis). For both inside and outside storage, an important amount of moisture evaporated naturally, thereby reducing the subsequent cost of artificial drying or improving the net heat value of the woody crop for combustion. Storage inside was considerably better than storage outside because it protected bales 24 against any further moisture accumulation due to precipitation. In practice, the choice between inside and outside storage and the duration of storage will depend on various factors, including the availability of shelter, the urgency or non-urgency to use the woody crops and the cost.

While a preferred embodiment of the present invention has been illustrated and described herein, it will be appreciated that various changes and modifications as may be therein without departing from the spirit of the invention as defined by the scope of the appended claims.

For example, although the harvester of the present invention has been described in relation to a round baler, square or rectangular baler configurations can also be used. It will be clear that any suitable baling machine having a bale chamber in which the bale is formed can be used in the performance of the invention. Alternatively, other known baler configurations can be used as the basis for the woody crop harvester of the present invention. For example, balers having a single pair of wheels may be used and adapted by adding an additional pair of wheels. The reinforcing frame will not be necessary with balers having a strong enough frame or housing to support the woody crop processor of the invention. It will be understood that different balers may have different features to those described herein. For example, the power transmission from the tractor and within the harvester may differ from that as described. Hydraulic power can be used, for example. The invention has been described in relation to a harvester having a variable chamber. However, it will be appreciated that a fixed chamber harvester can also be used.

Although the cutter has been described as comprising circular saw blades, it can also take any other suitable configuration for cutting woody crop. Also, it will be understood that the number of the blades can be variable and be more or less than the four described above. Other configurations of cutter are possible, for example a chain saw or a heavy duty sickle bar.

The harvester can be integrated with a tractor or other vehicle to eliminate the need for the harvester to be towed by the tractor. However, it will be appreciated that a towed device has a low capital cost compared to a self-propelled device. Also, in a towed device, the power unit is dedicated to the task of woody crop harvesting rather than being used for other varied jobs as would be the case in a self-propelled device.

The invention claimed is:

1. A device for harvesting woody material, said device including:
   a rigid arm having:
      a first end moveably connected to the device, and
      a second end moveably connectable to a vehicle for towing the device such that the device may be offset from the vehicle during a line of travel;
   a processor arranged to mechanically work the woody material and to feed the mechanically worked woody material to a bale-forming mechanism, said bale-forming mechanism being arranged to form a bale of the mechanically worked woody material, the processor including:
      a crusher arranged to cut standing woody material and to compress or shred the woody material along its length to make the woody material more pliable, wherein the crusher includes a rotor in a housing, the rotor having crushing elements arranged to compress or shred the woody material against the housing in a crushing zone as the rotor rotates, and
      an adjustable adjustor plate that protrudes into the crushing zone to vary the extent of compression of the woody material by controlling the entry of the woody material into the crushing zone.

2. A device as claimed in claim 1, wherein the crushing elements include a plurality of hammers.

3. A device as claimed in claim 2, wherein each hammer of the plurality of hammers includes a gripping and a cutting edge to grip the woody material.

4. A device as claimed in claim 2, wherein the motion of the crushing elements and the rotor feeds the mechanically worked woody material to the bale-forming mechanism.

5. A device as claimed in claim 1, wherein the processor further includes a cutter at a front end of the device, the cutter being arranged to cut standing woody material and to guide the cut woody material to the crusher.

6. A device as claimed in claim 5, wherein the cutter includes at least one pair of circular saw blades, each saw blade of the at least one pair being arranged to rotate towards the other saw blade of the at least one pair and a portion of each of the saw blades overlapping one another to define a cutting point.

7. A device as claimed in claim 1, wherein the bale-forming mechanism includes a round bale chamber which is variable or fixed.

8. A device as claimed in claim 1, including an upper converger and a lower converger extending from a front face of the device for guiding the woody material to the processor, wherein both the upper and lower convergers comprise a pair of diverging arms connected by a cross bar spaced from the front face of the housing.

9. A device as claimed in claim 8, wherein the cross bar of the upper converger is spaced further from the front face of the housing than the cross bar of the lower converger.

10. A device as claimed in claim 1, wherein each hammer is movable in relation to the rotor.

11. A device as claimed in claim 10, wherein each hammer is mounted to the rotor by a hinge.

12. A device as claimed in claim 1, wherein each crushing element on the rotor is fixed.

13. A method for harvesting woody material, the method comprising the steps of:
(a) providing a processor arranged to mechanically work the woody material and to feed the mechanically worked woody material to a bale-forming mechanism, the bale-forming mechanism being arranged to form a bale of the mechanically worked woody material, the processor including:
a crusher arranged to cut standing woody material and to compress or shred the woody material along its length to make the woody material more pliable, wherein the crusher includes a rotor in a housing, the rotor having crushing elements arranged to compress or shred the woody material against the housing in a crushing zone as the rotor rotates, and
an adjustable adjustor plate that protrudes into the crushing zone to vary the extent of compression of the woody material by controlling the entry of the woody material into the crushing zone;
(b) mechanically working the woody material using the processor;
(c) feeding the mechanically worked woody material to the bale-forming mechanism; and
(d) forming a bale from the mechanically worked woody material.

14. The method as claimed in claim 13, wherein the mechanically working step further comprises cutting the standing woody material using the crusher.

15. The method as claimed in claim 13, further comprising cutting the woody material by rotating two circular saw blades towards each other before the mechanically working step.

16. The method as claimed in claim 13, further comprising gathering together the woody material by a converger of the device before step (b).

17. The method as claimed in claim 16, further comprising inclining standing woody material with the converger before the woody material is mechanically worked.

18. The method as claimed in claim 14, wherein the crushing elements include a plurality of hammers and wherein the mechanically working step includes compressing the woody material with the plurality of hammers against the housing of the rotor as the rotor rotates.

* * * * *